United States Patent
Kim

(10) Patent No.: US 12,505,335 B2
(45) Date of Patent: Dec. 23, 2025

(54) PROCESSING HETEROGENEOUS GENERATIVE ARTIFICIAL INTELLIGENCE MODELS

(71) Applicant: DEEPX CO., LTD., Seongnam-si (KR)

(72) Inventor: Lok Won Kim, Yongin-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/260,485

(22) Filed: Jul. 5, 2025

(65) Prior Publication Data

US 2025/0335752 A1    Oct. 30, 2025

Related U.S. Application Data

(63) Continuation of application No. PCT/KR2025/001719, filed on Feb. 5, 2025.

(30) Foreign Application Priority Data

Feb. 5, 2024    (KR) .......................... 10-2024-0017704

(51) Int. Cl.
*G06N 3/0475*    (2023.01)
(52) U.S. Cl.
CPC .................................. *G06N 3/0475* (2023.01)
(58) Field of Classification Search
CPC ......... G06N 3/0475; G06N 3/045; G06F 3/09
See application file for complete search history.

(56) References Cited

U.S. PATENT DOCUMENTS

| 2023/0079074 | A1  | 3/2023  | Cella et al. |
| 2024/0320433 | A1* | 9/2024  | Lott ...................... G06F 40/284 |
| 2024/0354346 | A1* | 10/2024 | Lott .................... G06F 16/9027 |
| 2024/0362468 | A1* | 10/2024 | Lee ......................... G06N 3/047 |
| 2025/0021761 | A1* | 1/2025  | Santhanam ........... G06F 40/284 |
| 2025/0124255 | A1* | 4/2025  | Bergner ............... G06N 3/0475 |
| 2025/0200358 | A1* | 6/2025  | Lee ........................... G06N 3/08 |
| 2025/0209271 | A1* | 6/2025  | Imanigooghari ....... G06F 40/40 |
| 2025/0231989 | A1* | 7/2025  | Lott .................... G06F 16/9027 |
| 2025/0245430 | A1* | 7/2025  | Jeon ...................... G06F 40/284 |
| 2025/0245530 | A1* | 7/2025  | Goel ..................... G06N 3/0475 |

FOREIGN PATENT DOCUMENTS

| KR | 10-2022-0036980 A | 3/2022 |
| KR | 10-2022-0067871 A | 5/2022 |

(Continued)

OTHER PUBLICATIONS

Kim, Lok-Won. "DeepX: Deep learning accelerator for restricted boltzmann machine artificial neural networks." IEEE transactions on neural networks and learning systems 29.5 (2017): 1441-1453. (Year: 2018).*

(Continued)

*Primary Examiner* — Randall K. Baldwin

(57) ABSTRACT

A device includes a memory of a capacity to store a generative neural network model with first parameters. The device also includes a neural processing unit that generates a response corresponding to an input query utilizing the generative neural network model stored in the memory. The neural processing unit may store execution code of the generative neural network model compiled to process speculative decoding.

18 Claims, 9 Drawing Sheets

(56) References Cited

FOREIGN PATENT DOCUMENTS

KR     10-2022-0160814 A    12/2022
KR         10-2481428 B1    12/2022

OTHER PUBLICATIONS

Liu, Xiaoxuan, et al. "Online speculative decoding." arXiv preprint arXiv:2310.07177 v2 (2023). (Year: 2023).*
Park, Brian Changeun. "Adaptive Speculative Decoding for Large Language Models." (2024): i-73 (Year: 2024).*
Hooper, Coleman, et al. "SPEED: Speculative Pipelined Execution for Efficient Decoding." arXiv e-prints (Jan. 2024): arXiv-2310 v2. (Year: 2024).*
Le, Hung. "Memory and attention in deep learning." arXiv preprint arXiv:2107.01390 (2021). (Year: 2021).*
Hernández, Adrián, and José M. Amigó. "Attention mechanisms and their applications to complex systems." Entropy 23.3 (2021): 283. (Year: 2021).*
International Search Report of PCT/KR2025/001719 mailed on May 2, 2025.

* cited by examiner

PROCESSING HETEROGENEOUS GENERATIVE ARTIFICIAL INTELLIGENCE MODELS

CROSS-REFERENCE TO RELATED APPLICATIONS

This is a bypass continuation of International PCT Application No. PCT/KR2025/001719, filed on Feb. 5, 2025, which claims priority to Republic of Korea Patent Application No. 10-2024-0017704, filed on Feb. 5, 2024, which are incorporated by reference herein in their entirety.

TECHNICAL FIELD

The present disclosure relates to a system for processing heterogeneous generative artificial intelligence models. More specifically, the present disclosure relates to a federated operation system for processing heterogeneous language models.

BACKGROUND ART

Humans have the intelligence to recognize, classify, infer, predict, control/decision making, and the like. Artificial Intelligence (AI) refers to the artificial imitation of human intelligence.

The human brain is made up of tons of nerve cells called neurons. Each neuron is connected to hundreds to thousands of other neurons through connections called synapses. To mimic human intelligence, the operation of biological neurons and the connections between neurons are modeled in a neural network (NN) model. That is, the neural network model is a system of nodes connected in a layer structure that mimics neurons.

According to the advancement of neural network technology, the application of neural network inference services utilizing big data-based training is becoming increasingly diverse. These inference services train neural networks on massive data sets, and as a result, the trained models are able to perform inference on diverse and complex data. However, according to the ever-increasing capabilities and accuracy required by neural network inference services, the parameter size, computational complexity, and memory bandwidth demands of neural network models are growing exponentially. As a result, the performance requirements for processors and memory capable of supporting these inference tasks are also increasing. To address these needs, neural network inference services are increasingly being deployed on cloud computing-based servers that provide efficient processing capabilities for large-scale data operations.

Generative AI models are increasingly being developed to work in a variety of environments. These models include a variety of neural network models, including language models for interactive systems, stable diffusion models for generating images from text input, and transformer models for predicting and determining future activity based on a sequence of events in a given situation. The computational cost of responding to input queries with these generative AI models can be very expensive. For example, among generative AI models, large language models (LLMs) have been commercialized in earnest. For now, only high-performance general-purpose graphics processing units (GPGPUs) can provide enough computing power for LLM processing. However, the total power consumption of GPGPUs operating globally to process these LLMs has reached a level comparable to the power consumption of an entire country, and this excessive energy demand poses a serious problem for the commercialization of LLMs. Building GPGPU-based data centers to provide LLM services requires careful evaluation of power plant capacity to determine whether the required energy can be supplied, and the difficulty of meeting the energy demand of these data centers in many urban areas is a significant barrier to widespread deployment of large-scale AI models.

SUMMARY

Embodiments relate to a device for performing speculative decoding. The device includes a first memory of a first capacity and a first neural processing unit. The first memory has a first capacity and stores first parameters of a first generative neural network model. The first neural processing unit reads at least a subset of the first parameters to execute the first generative neural network, and generates a response corresponding to an input query by processing the input query using the executed first generative neural network model. The response is used to perform speculative decoding in conjunction with a second generative neural network of a higher performance than the first generative neural network.

In one or more embodiments, the number of second parameters of the second generative neural network is greater than the number of the first parameters.

In one or more embodiments, the first neural processing unit further stores at least part of first execution code for executing the first generative neural network model.

In one or more embodiments, the first neural processing unit stores at least part of second execution code for executing the second generative neural network model.

In one or more embodiments, the first neural processing unit further includes an internal memory that communicates with the first memory and a controller circuit that controls operations of the first neural processing unit.

In one or more embodiments, a first execution code for executing the first generative neural network model is stored in the internal memory or in the controller circuit.

In one or more embodiments, the device further includes a second memory of a second capacity to store second parameters of the second generative neural network model.

In one or more embodiments, the device further includes a second memory and a second neural processing unit. The second memory has a second capacity to store second parameters of the second generative neural network model. The second neural processing unit reads at least a subset of the second parameters to execute the second generative neural network, and executes the second generative neural network to accept or reject at least a subset of the response as part of the speculative decoding.

In one or more embodiments, the response includes at least a token generated by executing the first generative neural network.

In one or more embodiments, one of the first neural processing unit and the second neural processing unit operates in a low-power mode while awaiting computational results for the speculative decoding from another of the first neural processing unit and the second neural processing unit.

Embodiments also relate to a system including a device and an on-premises server. The device includes a first memory of a first capacity to store first parameters of a first generative neural network model, and a first neural processing unit that reads the first parameters and generates a response to an input query by executing the first generative neural network model on the input query. The on-premises server is coupled to the device and includes a second memory of a second capacity to store second parameters of a second generative neural network model of a higher performance than the first generative neural network, and a second neural processing unit reads the second parameters and receives the response to perform speculative decoding on the input query in conjunction with the first neural processing unit.

Embodiments also relate to a device that includes a memory to store a generative neural network model, and a neural processing unit that generates a response corresponding to an input query by reading the generative neural network model from the memory and executing the generative neural network model on the input query. The neural processing unit includes a processing core circuit that receives input integer parameters, a vector core circuit and a scalar core circuit that receives input floating-point parameters, and a number format conversion circuit that converts between the integer parameters and the floating-point parameters to process the generative neural network model.

DETAILED DESCRIPTION

Figure 1:
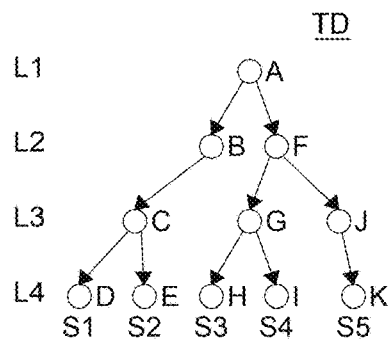
FIG. 1 illustrates data tree utilized for speculative decoding, according to examples of the present disclosure.

Certain structural or step-by-step descriptions of examples according to the concepts of the present disclosure are provided for the purpose of illustrating examples according to the concepts of the present disclosure only.

Embodiments according to the concepts of the present disclosure may be practiced in various forms. The present disclosure should not be construed as limiting to the embodiments described herein.

Embodiments according to the concepts of the present disclosure may be subject to various modifications. The present disclosure may take many forms. Accordingly, certain examples are illustrated in the drawings and described in detail in the present disclosure. However, this is not intended to limit the examples according to the concepts of the present disclosure to any particular disclosed form, and it is therefore to be understood that all modifications, equivalents or substitutions that fall within the scope of the present disclosure are included in the present disclosure.

Terms such as first and/or second may be used to describe various elements. However, the present disclosure is not to be limited by such terms.

The above terms are used only for the purpose of distinguishing one element from another. For example, a first element may be named as a second element, and similarly, a second element may be named as a first element, without departing from the scope of the claims according to the concepts of the present disclosure.

When an element is referred to as being "connected" or "coupled" to another element, it is to be understood that the element may be directly connected or coupled to that other element, but that there may be other elements in between. On the other hand, when an element is referred to as being "directly connected" or "directly connected" to another element, it should be understood that there are no other elements in between.

Other expressions that describe the relationship between elements, such as "between" and "directly between" or "adjacent to" and "directly adjacent to" should be interpreted similarly.

As used herein, expressions such as "A or B," "at least one of A and/or B," or "one or more of A and/or B" may include any possible combination of the items listed together. For example, "A or B," "at least one of A and B," or "at least one of A or B" can refer to all of the following: (1) including at least one A, (2) including at least one B, or (3) including both at least one A and at least one B.

As used in the present disclosure, expressions such as "first," "second," "first," or "second," may refer to various elements, in any order and/or order of importance. These expressions are used to distinguish one element from another and do not limit those elements. For example, the first user device and the second user device may refer to different user devices, in any order or order of importance. For example, the first element may be named the second element, and similarly, the second element may be named interchangeably with the first element, without departing from the scope of the disclosure herein.

The terms used in the present disclosure are used to describe particular embodiments only and are not intended to limit the scope of other examples.

Expressions in the singular may include the plural unless the context clearly indicates otherwise. Terms used herein, including technical or scientific terms, are intended to have the same meaning as commonly understood by one of ordinary skill in the art described herein.

Terms used in the present disclosure that have common dictionary definitions are to be interpreted as having the same or similar meanings as they have in the context of the related art. The terms used in the present disclosure are not to be construed in an idealized or overly formal sense, unless expressly defined herein. Accordingly, even defined terms herein shall not be construed to exclude embodiments of the present disclosure.

The terms used in the present disclosure are used to describe particular embodiments only and are not intended to limit the present disclosure.

Expressions of the singular include the plural unless the context clearly indicates otherwise. In this specification, the terms "includes" or "has" and the like are intended to designate the presence of the described features, numbers, steps, operations, elements, parts, or combinations thereof, and should therefore be understood as not precluding the possibility of the presence or addition of one or more other features, numbers, steps, operations, elements, parts, or combinations thereof.

Unless otherwise defined, all terms used herein, including technical or scientific terms, shall have the same meaning as commonly understood by one of ordinary skill in the art to which the present disclosure belongs. Such terms, as defined in commonly used dictionaries, shall be construed to have meanings consistent with their meaning in the context of the related art. Unless expressly defined in the present disclosure, they are not to be construed in an idealized or overly formal sense.

The features of the various examples of the present disclosure may be combined or combined with each other, in part or in whole. The various examples of the present disclosure may be interlocked and operated in various technical ways as will be appreciated by those skilled in the art. Each of the examples of the present disclosure may be practiced independently of each other or may be practiced together in connection with each other.

In describing each example, technical details that are familiar to those skilled in the art to which the present disclosure belongs and that are not directly related to the present disclosure will be omitted. This is done in order to make the present disclosure clearer without obscuring the essence of the disclosure by omitting unnecessary explanations.

According to examples of the present disclosure, devices, methods, systems, and computer-readable media can be provided that enable on-device operation of generative artificial intelligence services.

Neural networks are divided into 'single-layer neural networks' and 'multi-layer neural networks' according to the number of layers. A typical multilayer neural network consists of an input layer, a hidden layer, and an output layer. (1) The input layer is the layer that accepts input values, and the number of input layers is the same as the number of variables that are input. (2) The hidden layer is located between the input layer and the output layer, and it is a layer that receives signals from the input layer, extracts features, and passes them to the output layer. (3) The output layer is a layer that receives signals from the hidden layer and outputs them to the outside.

In order to realize higher artificial intelligence, a deep neural network (DNN) with an increased number of hidden layers has been disclosed. Among DNNs, the transformer neural network is a DNN based on the attention technique. Transformers utilize many matrix multiplication operations. A transformer can take an input value and parameters such as query (Q), key (K), and value (V) to obtain attention parameters (Q, K, V), which are operational values. The transformer may process various inference operations based on the operational values (e.g., the attention (Q, K, V)). Transformers have shown excellent performance in the field of generative artificial intelligence.

Transformer-based neural network models are being utilized in language models. For example, a language model may take a textual query as input and generate a response. The response generated by the language model may be generated by re-inputting the tokens generated as part of the response generated by the language model back into the language model. The cost of generating a response of such a language model is proportional to the number of parameters of the language model. Therefore, the computational cost of generating a response using a language model with a large number of parameters is high. Conversely, reducing the number of parameters can lower the computational cost and improve the response speed, but the quality of the generated response may suffer.

Generally speaking, a transformer-based generative AI model takes a query as input and generates a response. For example, a language model receives a query in the form of text as input and generates a token as a response. Then, the query and the generated token are input to the language model iteratively to generate the next token. Such token generation operation may be repeated multiple times until the response to the query is complete. The tokens may correspond to words or parts of words. The response generated by the language model may comprise a sequence of tokens that are further generated by passing the tokens generated as part of the response generated by the language model back into the language model.

The cost of generating a response for such a language model is increased with the increase in the number of parameters in the language model. Therefore, the computational cost of generating a response using a language model with a large number of parameters is high. However, reducing the number of parameters can lower the computational cost and improve response speed, but at the expense of response accuracy. In other words, there is a trade-off between the number of parameters in the language model and the time it takes the processor to process the operations to generate the tokens in the language model.

In particular, the number of parameters in a language model must be significant in order to generate responses of a certain level of quality. On the other hand, processing such a language model can be challenging due to on-device hardware resource constraints (e.g., energy consumption, battery capacity, memory capacity, AI processing power, etc.)

Accordingly, the present disclosure presents, through various examples, a federated operation system of language models utilizing speculative decoding to drive heterogeneous language models utilizing limited hardware resources on-device.

According to examples of the present disclosure, the federated operation system of heterogeneous language models may include at least one neural processing unit, at least one memory, and may drive the heterogeneous language models with the at least one neural processing unit.

To accelerate the rate of token generation of the language model, the speculative decoding may be used heterogeneous language models. According to examples of the present disclosure, the heterogeneous language models may include at least a first language model and a second language model. In some examples, the heterogeneous language models may include a first through a third language model. In some examples, the heterogeneous language models may include a first through a fourth language model.

The number of parameters in the first language model is smaller than the number of parameters in the second language model. The number of parameters of the second language model is smaller than the number of parameters of the third language model. The number of parameters of the third language model is smaller than the number of parameters of the fourth language model, e.g., the number of parameters of the heterogeneous language models is different. A language model with a relatively small number of parameters can be defined as a lower performance model, and a language model with a relatively large number of parameters can be defined as a higher performance model. That is, a first language model can be defined as a lower performance model of a second language model, and a second language model can be defined as a higher performance model of a first language model. The second language model may be defined as a lower performance model of the third language model, and the third language model may be defined as a higher performance model of the second language model. The first language model may be defined as a lower performance model of the second language model, and the second language model may be defined as a higher performance model of the first language model.

The lower performance model may utilize a language model where the number of parameters is determined by considering the hardware resource limitations of the on-device being processed. The higher performance model may utilize a language model where the number of parameters is determined by considering the hardware resource limitations of the device being processed. For example, the number of parameters in the higher performance model may be 7 billion, while the number of parameters in the lower performance model may be 1 billion. For example, the number of parameters in the higher performance model may be 32 billion, the number of parameters in the middle model may be 7 billion, and the number of parameters in the lower performance model may be 1 billion.

The following describes speculative decoding as utilized in examples of the present disclosure. A system according to examples of the present disclosure have a lower performance model and a higher performance model collaborate with each other to perform speculative decoding. The speculative decoding utilizes at least one neural processing unit to generate responses to input queries in which heterogeneous language models collaborate to generate responses to input queries.

Using the on-device neural processing unit, the lower performance model may generate probabilities used to sample the additional tokens based on the speculatively generated additional tokens and the currently allowed token set. Using the on-device neural processing unit, the higher performance model may generate tokens based on the tokens generated by the lower performance model. The higher performance model may accept or reject at least one token based on sampling of additional tokens speculatively generated by the lower performance model. The acceptance or rejection of the higher performance model may be determined by comparing a probability generated by the higher performance model corresponding to each token with a probability generated by the lower performance model corresponding to each token.

According to speculative decoding according to examples of the present disclosure, the lower performance model may generate one or more token candidate sets to generate a response corresponding to a query input to the lower performance model. Accordingly, the higher performance model may accept or reject the at least one token candidate set by sampling for each token candidate set. If the system samples for each token candidate set, the system may generate more tokens faster than the system that samples for each token. Also, the probability distributions of the lower performance model and the higher performance model can be kept similar. The token generation rate may be indicated in terms of tokens per second (TPS).

According to examples of the present disclosure, in speculative decoding of the system, the system may parallel process the lower performance model and the higher performance model. In parallel processing the speculative decoding, the lower performance model may generate one or more tokens, and the higher performance model may sample the tokens previously generated by the lower performance model and accept or reject them.

The speculative decoding according to examples of the present disclosure may operate in an autoregressive token generation manner. An autoregressive token generation method generates tokens by feeding a set of tokens generated by a lower performance model back into the lower performance model. The lower performance model generates one token per autoregression, and hence, if the lower performance model makes N inferences, it will generate a series of N tokens. The lower performance model generates conditional probability distributions associated with the series of N tokens. The higher performance model then processes the series of N tokens generated by the lower performance model and the conditional probability distribution associated with the series of N tokens to generate the higher performance model's probability distribution. The higher performance model can then accept or reject the tokens generated by the lower performance model by comparing the probability distribution generated by the higher performance model with the conditional probability distribution generated by the lower performance model. The acceptance of the token by the higher performance model may be determined by setting a threshold value. The threshold value may be a value that accepts the token when the degree of similarity between the probability distribution value of the higher performance model and the conditional probability distribution value of the lower performance model is equal to or greater than the threshold value, and rejects the token when the degree of similarity is less than the threshold value.

The higher performance model can accept or reject a series of tokens generated by the lower performance model based on a threshold. If a particular token in the series is rejected, the token before the rejection become the final token.

In some examples, the lower performance model of speculative decoding may generate tokens in sets. In such cases, the higher performance model may accept or reject per set of the plurality of tokens generated by the lower performance model. When the lower performance model generates tokens in sets, the acceptance or rejection judgment in the higher performance model may also be made in sets of tokens, which may improve the token generation speed of the speculative decoding of the system. Further, as the number of token sets generated by the lower performance model increases, the probability of a token set being accepted by the higher performance model may increase.

The lower performance model generates one or more token sets in response to the input query. Each token set includes a series of tokens, and the lower performance model selects a series of high-probability tokens from the probability distribution as the token set. Each token set may be selected in a variety of ways. For example, each token set may be generated by selecting tokens that have the highest probability within a probability distribution, but the present disclosure is not limited to this, and token sets may be generated in a variety of ways. For the higher performance model to accept a set of tokens, the probabilities of the tokens in each token set may be summed. Thus, the higher performance model may accept or reject a set of tokens based on the summed probability of the set of tokens, rather than the probability of each individual token. Also, utilizing the probability of each token increases the probability of rejection by the higher performance model because it may be difficult to match the probabilities of each token generated by the lower performance model and the higher performance model. Utilizing the summed probabilities of the token set increases the probability of acceptance by the higher performance model because the matching of the summed probabilities of the token sets generated by the lower performance model and the higher performance model may be more similar.

The lower performance model may generate one or more token sets in response to an input query. The one or more token sets may be generated statically or dynamically. For example, the sequence length of each token set may be preset. The lower performance model may generate the one or more token sets and combine the token sets to generate data tree. The data tree may include nodes at each branch.

FIG. 1 illustrates data tree utilized for speculative decoding according to examples of the present disclosure. Referring to FIG. 1, an example of data tree (TD) including one or more token sets generated by a lower performance model is illustrated. More specifically, a first token set (S1), a second token set (S2), a third token set (S3), a fourth token set (S4), and a fifth token set (S5) are shown.

The first token set (S1) includes four tokens (A, B, C, D). The second token set (S2) includes four tokens (A, B, C, E). The third token set (S3) includes four tokens (A, F, G, H). The fourth token set (S4) includes four tokens (A, F, G, I). The fifth token set (S5) includes four tokens (A, F, J, K). Each token set is a candidate that may be selected or rejected by the higher performance model.

Each token set may have a determined sequence length. For example, the sequence length of each token set may be set to 4. However, the present disclosure is not limited thereto, and the lengths of the token sets may change dynamically.

Each token can have a sequence level. The sequence level may correspond to a sequence length. More specifically, the first sequence level (L1) corresponds to token (A). The second sequence level (L2) corresponds to tokens (B, F). The third sequence level (L3) corresponds to tokens (C, G, J). The fourth sequence level (L4) corresponds to tokens (D, E, H, I, K). In the example where the sequence length is set to 4, the sequence level is also set to 4. The order of the tokens of each token set may be arranged according to the corresponding sequence level. In detail, the first token (A) among the tokens (A, B, C, D) of the first token set (S1) corresponds to the first sequence level (L1). The second token (B) among the tokens (A, B, C, D) of the first token set (S1) corresponds to the second sequence level (L2). The third token (C) among the tokens (A, B, C, D) of the first token set (S1) corresponds to the third sequence level (L3). The fourth token (D) among the tokens (A, B, C, D) of the first token set (S1) corresponds to the fourth sequence level (L4).

Each token is defined as a node in the data tree (TD). For example, a token (G) may be a branch of a third token set (S3) and a fourth token set (S4) at a third sequence level (L3). Each node includes branch information.

That is, the data tree (TD) generated by the lower performance model may include all or at least some of the one or more token sets (S1 to S5), sequence levels (L1 to L4), node (A, B, C, D, E, F, G, H, I, J, K) information for each token, and a selection probability (e.g., a summed probability of the token sets) for each token set. The higher performance model may accept or reject the at least one token of the data tree (TD).

In one or more embodiments, speculative decoding is implemented as hybrid speculative decoding. In hybrid speculative decoding, a previously speculatively generated token is validated by a higher performance model, and a threshold a can be set to determine whether the token is accepted or rejected by comparing the probability distributions of the lower performance model and the higher performance model.

In some embodiments, the speculative decoding is implemented as group speculative decoding. Group speculative decoding may provide a high level of efficiency, where multiple tokens are generated as a group from a lower performance model, and are configured to be verified by a higher performance model.

Figure 2:
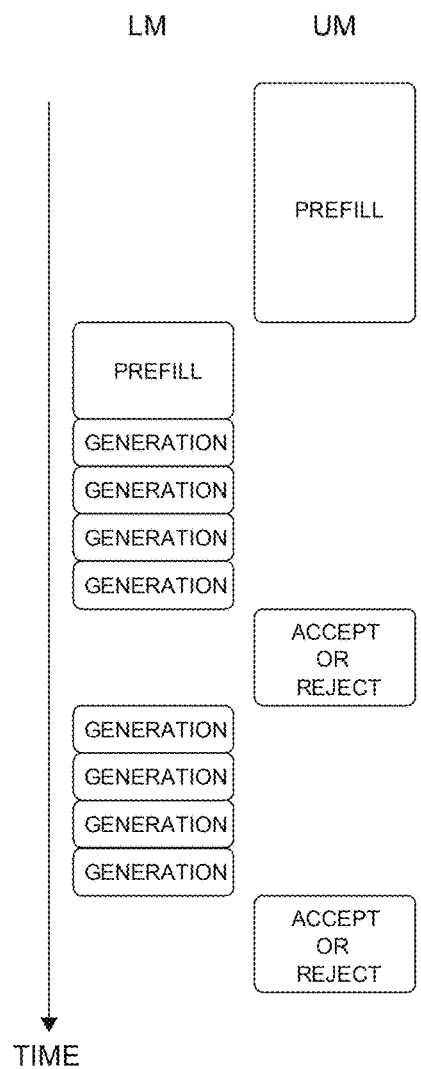
FIG. 2 schematically illustrates a speculative decoding operation, according to the first example of the present disclosure.

FIG. 2 schematically illustrates a speculative decoding operation, according to the first example of the present disclosure. Referring to FIG. 2, a lower performance model (LM) and a higher performance model (UM) are illustrated. A device according to examples of the present disclosure includes one or more neural processing units. The one or more neural processing units may be configured to process the lower performance model (LM) and the higher performance model (UM) sequentially or in parallel for speculative decoding.

First, a typical transformer-based neural network model includes computational steps (e.g., a prefill step and a generation step) to generate a response to an input query. A transformer neural network is a neural network based on attention techniques. It utilizes many matrix multiplication operations. A transformer can take an input value and parameters such as query (Q), key (K), and value (V) to obtain an output value, an attention (Q, K, V). Based on the output value (e.g., the attention (Q, K, V)), the transformer can perform various inference operations. Transformers are actively utilized in language generation models. The attention parameters may be represented as tensors.

The prefill stage is the initial stage of processing input (e.g., prompts). The prefill step may include a tokenization step, a context embedding step, a step of processing through layers, and a preparation step for decoding. The prefill step may be processed in one or more neural processing units. In the tokenization step, the input text is converted into tokens (sub words, words, or characters), which are numerical representations used by the neural network model. In a context embedding step, the tokens are mapped to dense vector embeddings that encode semantic and syntactic information. In the processing through layers stage, the embeddings are processed through multiple layers of the neural network model (e.g., transformer blocks) to create a contextual representation of the input tokens. In the preparation step for decoding, the neural network model computes probabilities for the next token based on the input context, but does not yet generate the next token. Instead, it sets the context for the generation phase.

In the generation step, the neural network model sequentially generates one or more tokens based on the context provided by the prefill step and previously generated tokens. The generate step includes an initial prediction step, and an autoregressive processing step. The generation step may be processed in one or more neural processing units. In the initial prediction step, the first token is generated by sampling from a probability distribution computed in the prefill step. In the autoregressive processing step, each subsequent token is generated by incorporating the previous tokens (including the generated token) into the context of the neural network model. The generation process continues until a stop condition is met, such as reaching the maximum token limit, encountering a special end-of-sequence token (e.g., end of sequence (EOS)), or achieving a specific semantic goal. The series of tokens generated in the generation step may correspond to nodes in the data tree (TD) of FIG. 1. The data tree may include at least one token set.

Referring again to FIG. 2, an example of processing speculative decoding is illustrated. Speculative decoding according to examples of the present disclosure involve sequential processing at one neural processing unit. The speculative decoding includes a higher performance model (UM) and a lower performance model (LM) cooperating with each other to generate a response to an input query. The performance as described herein refers to the accuracy of prediction or inference.

Specifically, in speculative decoding, the higher performance model (UM) performs a prefill operation first. The lower performance model (LM) then performs a prefill operation. The lower performance model (LM) then performs successive generation steps, where each token is generated in each generation step. Next, the higher performance model (UM) accepts or rejects the tokens generated by the lower performance model (LM). The higher performance model (UM) may accept or reject some or all of the tokens generated by the lower performance model (LM). The lower performance model (LM) may then feed the accepted tokens back into the input query, and the lower performance model (LM) may successively perform generation steps such that each token corresponding to each generation step is generated. Next, the higher performance model (UM) accepts or rejects the tokens generated by the lower performance model (LM). The above steps are repeated until the stop conditions are met.

Referring to FIG. 2, the number of parameters of the higher performance model (UM) is larger than the number of parameters of the lower performance model (LM), e.g., the number of parameters of the heterogeneous language models are different. Therefore, the processing time of the prefill step of the higher performance model (UM) is longer than the processing time of the prefill step of the lower performance model (LM). The processing time of the acceptance or rejection step of the higher performance model (UM) is longer than the processing time of the generation step of the lower performance model (LM). Accordingly, a larger number of token generation in the lower performance model may improve the token generation speed of the system.

The lower performance model may utilize a language model where the number of parameters is determined by considering the hardware resource constraints of the on-device being processed. The higher performance model may utilize a language model where the number of parameters is determined by considering the hardware resource constraints of the device being processed.

In some examples, the lower performance model may be a model that prunes the parameters of the higher performance model. For example, the lower performance model may be a model that prunes the parameters of the higher performance model. In such cases, the parameters of the pruned neural network model may be lightweight and may require less memory bandwidth than the higher performance model.

The one or more neural processing units according to examples of the present disclosure are configured to process the prefill operation by selecting a higher performance model (UM) to process the speculative decoding. Further, the one or more neural processing units according to examples of the present disclosure are configured to process the prefill operation and the generation operation by selecting a lower performance model (LM) to process the speculative decoding.

Figure 3:
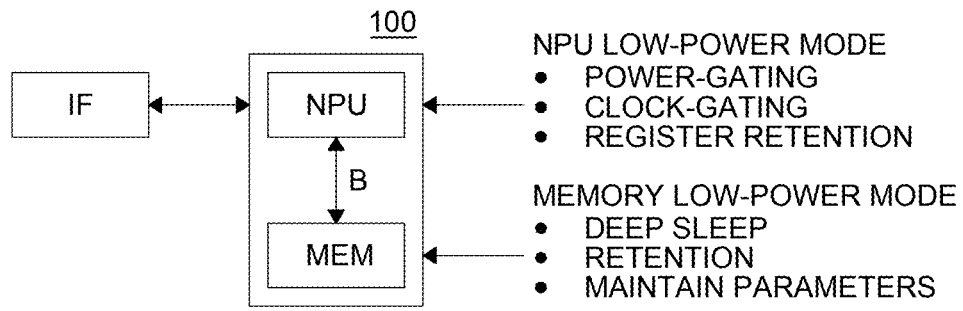
FIG. 3 illustrates a device, according to the first embodiment of the first example of the present disclosure.

FIG. 3 illustrates a device 100 according to the first embodiment of the first example of the present disclosure. Referring to FIG. 3, the device 100 includes a neural processing unit (NPU), and a memory (MEM). The device 100 may further include at least one of a communication bus (not shown), a CPU (not shown), a GPU (not shown), and a storage device (not shown).

According to the first embodiment of the first example of the present disclosure, the device 100 is configured to provide hyperscale level of AI services with an on-device at low-power utilizing speculative decoding. According to the device 100 according to the first embodiment of the first example of the present disclosure, AI services may be provided only on-device, thereby protecting the personal information and privacy of the user.

The device 100 according to the first embodiment of the first example of the present disclosure is configured to receive an input query via an interface (IF). The interface (IF) may be an input device configured to convey an input query, such as a prompt, gesture, voice, or the like. An input device capable of communicating an input query may include, for example, a mouse, a keyboard, a touch pad, a touch screen, a microphone, a wireless communication device, a wired communication device, or the like.

A communication bus (B) is provided between the neural processing unit (NPU) and the memory (MEM). In an example, the communication bus (B) may include a high-speed data bus such as an Advanced eXtensible Interface (AXI). The communication bus (B) may be a dedicated communication bus for the neural processing unit (NPU) and the memory (MEM), and may provide a stable memory bandwidth for the speculative decoding. The memory bandwidth may be determined according to a processing power of the neural processing unit (NPU), such as tera-operations per second (TOPS) of the neural processing unit. For example, 1 TOPS may require 2 GB/s to 4 GB/s of memory (MEM) bandwidth. For example, a 10 TOPS NPU may have the memory (MEM) configured to provide a bandwidth of the memory (MEM) of 20 GB/s to 40 GB/s. The memory bandwidth may be determined according to the operation frequency of the memory (MEM) and the number of communication channels. For example, to configure a memory bandwidth of 40 GB/s with LPDDR5, the following formula may be used: Memory bandwidth (GB/s)=(data rate (Gbps per pin) x bus width (bits) x number of channels÷8). LPDDR5 typically supports data rates up to 6,400 Mbps per pin. Additionally, the bus width of an LPDDR channel is typically 16 bits (2 bytes). The number of channels cannot be a decimal number, but an integer. The examples of the present disclosure are not limited to the bandwidth of the memory bus.

The neural processing unit (NPU) of the device 100 according to the first embodiment of the first example of the present disclosure is an application specific integrated circuit (ASIC) implemented as an accelerator dedicated to neural network inference. As an example of the neural processing unit (NPU), it may be designed to have a computational performance of 5 TOPS, 10 TOPS, 25 TOPS, 50 TOPS, and the like. An example neural processing unit (NPU) may be designed to have a computational performance of 5 TOPS to 50 TOPS. The computational performance of the neural processing unit (NPU) may vary according to the number of processing elements included in the processing core. The neural processing unit (NPU) may be referred to as a tensor processing unit (TPU), a neural signal processor (NSP), a neural network processor (NNP), and the like.

The neural processing unit (NPU) of the device 100 according to the first embodiment of the first example of the present disclosure may be configured as a system-on-chip (SoC). A system-on-chip may refer to a semiconductor package that integrates at least one neural processing unit (NPU) and elements of various electronic systems. The system-on-chip may integrate digital circuitry, analog circuitry, mixed signal and radio frequency processing circuitry into a single package. For example, a processor that may be further included in the system-on-chip may be at least one of a central processing unit (CPU), a digital signal processor (DSP), an image signal processor (ISP), and a graphics processing unit (GPU). The system-on-chip may include at least one memory. The system-on-chip may include a high-speed data bus for efficient communication between multiple circuits included in the system-on-chip. The system-on-chip may include at least one interface, such as PCIe, USB, I2C, SPI, UART, GPIO, for connectivity with external devices and sensors. The system-on-chip may include an on-chip power management device to regulate voltage and power distribution of the semiconductor package. The system-on-chip may include a communication interface that integrates wired and wireless communication protocols such as Ethernet, Wi-Fi, Bluetooth, and cellular connectivity for data transfer.

The neural processing unit (NPU) of the device 100 according to the first embodiment of the first example of the present disclosure is configured to perform inference using a higher performance model (UM) and a lower performance model (LM). The higher performance model (UM) and the lower performance model (LM) are configured to cooperate with each other to process the speculative decoding, as described above with reference to FIGS. 1 and 2.

The neural processing unit (NPU) is configured to alternately process the higher performance model (UM) and the lower performance model (LM), i.e., the neural processing unit (NPU) operates to process the higher performance model (UM) and the lower performance model (LM) sequentially. In other words, the neural processing unit (NPU) is operated to process the higher performance model (UM) and the lower performance model (LM) in a time-divisional manner. Thus, the higher performance model (UM) and the lower performance model (LM) can be processed sequentially while increasing the utilization rate of the calculation circuits of the neural processing unit (NPU). Furthermore, the operation of the speculative decoding may reduce the bottleneck caused by the speculative decoding operation in the neural processing unit (NPU) of the device 100 because the higher performance model (UM) and the lower performance model (LM) may be processed sequentially in the neural processing unit (NPU) of the device 100, and the parameters of the higher performance model (UM) and the lower performance model (LM) reside in the memory (MEM).

The memory (MEM) of the device 100 according to the first embodiment of the first example of the present disclosure is configured to store both the weight parameters of the higher performance model (UM) and the weight parameters of the lower performance model (LM) when the device 100 is in operation. By storing both the weight parameters of the higher performance model (UM) and the lower performance model (LM) in the memory (MEM), the device 100 can efficiently perform the speculative decoding.

The memory (MEM) of the device 100 according to the first embodiment of the first example of the present disclosure is configured to provide the parameters of the higher performance model (UM) to the neural processing unit (NPU) when the neural processing unit (NPU) is performing inference using the higher performance model (UM), and to provide the parameters of the lower performance model (LM) to the neural processing unit (NPU) when the neural processing unit (NPU) is performing inference using the lower performance model (LM).

For example, the device 100 may set an address map of the memory (MEM) to allocate memory banks in which the weight parameters of the higher performance model (UM) and the lower performance model (LM) are to be stored during the speculative decoding operation. Thus, at the time of the speculative decoding operation, the weight parameters of both the higher performance model (UM) and the lower performance model (LM) may be resident in the memory (MEM).

The memory (MEM) of the device 100 according to the first embodiment of the first example of the present disclosure may comprise at least one memory such as SRAM, LPDDR RAM, resistive RAM, magneto-resistive RAM, phase-change RAM, ferroelectric RAM, flash memory, HBM, and the like. The memory (MEM) may comprise at least one memory unit (e.g., a bank, etc.). The MEM may comprise a homogeneous memory or a heterogeneous memory.

Accordingly, the capacity of the memory (MEM) of the device 100 according to the first embodiment of the first example of the present disclosure is configured to be greater than the sum of the weight parameters of the higher performance model (UM) and the lower performance model (LM). Thus, the weight parameters of the higher performance model (UM) and the lower performance model (LM) may reside in the memory MEM. For example, the capacity of the memory (MEM) of the device 100 may be one of 4 GByte, 8 GByte, 16 GByte, or 32 GByte, e.g., the capacity of the memory (MEM) of the device 100 may be from 4 GByte to 32 GByte, and may be determined by considering the size of the parameters of the higher performance model (UM) and the lower performance model (LM) to be run on the device 100. By storing both the weight parameters of the higher performance model (UM) and the lower performance model (LM) in the memory (MEM), memory read and memory write operations to perform the speculative decoding may be reduced.

For example, the capacity of the memory may be determined by considering the requirements for a higher performance model (UM) and a lower performance model (LM) to be executed on the device 100, especially when employing speculative decoding. If the higher performance model (UM) is a model that includes 8 B (8 billion) parameters 1 and the lower performance model (LM) is a model that includes 1.5 B parameters, the required memory capacity for their respective parameters (assuming 16-bit floating point (FP16) precision, 2 bytes per parameter) would be 1.5 billion x 2 bytes=3 GB for the LM, and 8 billion x 2 bytes=16 GB for the UM. In addition to these model parameters, memory (MEM) must also be allocated for dynamic activations, primarily through the Key-Value (KV) Cache (i.e., attention parameters) for both models. For a typical maximum sequence length of 4096 tokens, the UM's KV Cache may require approximately 2.5 GB, and the LM's KV Cache about 0.8 GB, totaling roughly 3.3 GB for activations. Therefore, considering the combined parameter and activation storage, plus an approximate 15% for runtime overhead, a total of at least 32 GB of memory capacity may be provided for the device 100 to effectively support speculative decoding operations.

Power gating in a neural processing unit (NPU) is a technique for eliminating leakage power by completely de-energizing circuit blocks that are not in use. A circuit block to which power gating is applied is provided with a power switch. Accordingly, the power switch can be used to disconnect certain circuit blocks of the neural processing unit (NPU) from the power source. The power gating function can reduce or eliminate both dynamic power and leakage power, which is useful when the on-device is in a low-power mode.

Clock gating in a neural processing unit (NPU) is a technique for reducing dynamic power consumption by blocking clock signals from unused circuit blocks. A circuit block to which clock gating is applied can selectively block clock signals input to a specific circuit block using clock control logic. When clock gating is applied, the neural processing unit (NPU) is still powered, so that the state of the circuit can be maintained. Because clock gating is not powered down, operation can resume immediately upon re-enabling the clock, and dynamic power can be reduced by avoiding unnecessary switching activity.

Register retention in neural processing units (NPUs) is a technique to allow certain registers in a neural processing unit (NPU) to retain their state even when the power is turned-off. Registers that are subject to register retention can maintain the data stored in the register while in sleep mode, using only low-power. Thus, certain register values (e.g., important register values) are retained even when the register goes to sleep, eliminating the need for initialization upon return. Register retention can provide low-power operation, and data can be retained using very little power even when the neural processing unit (NPU) is powered off.

The device 100 according to the first embodiment of the first example of the present disclosure may be configured to provide low-power functionality for on-device utilization. The low-power mode of the device 100 according to the first embodiment of the first example of the present disclosure may be, for example, a sleep mode, a deep sleep mode, a retention mode, and the like. In some examples, the low-power mode may be referred to as a standby mode, a hibernation mode, an idle mode, and the like.

Sleep mode can be implemented, for example, by applying clock gating to the processing cores (not shown) of the neural processing unit (NPU). Deep sleep mode can be implemented, for example, by applying power gating to the processing cores (not shown) or memory (MEM) of the neural processing unit (NPU). The retention mode may be implemented by applying a minimal holding voltage to the registers (not shown) or memory (MEM) of the neural processing unit (NPU).

For example, the neural processing unit (NPU) of the device 100 according to the first embodiment of the first example of the present disclosure may be configured to provide at least one of the following functions: power gating, clock gating, and register retention. As further described, the neural processing unit (NPU) may enable the clock gating function when the device 100 enters a sleep mode. Additionally, the neural processing unit (NPU) may activate a power gating function when the device 100 enters the deep sleep mode. Additionally, the supply voltage input to the neural processing unit (NPU) may be reduced or the frequency of operation may be reduced when the device 100 enters the retention mode.

The device 100 according to the first embodiment of the first example of the present disclosure may be a device capable of operating in a battery environment. Accordingly, the neural processing unit (NPU) may be designed for operation with battery voltage.

The device 100 according to the first embodiment of the first example of the present disclosure may be configured to provide at least one low-power mode while simultaneously providing speculative decoding in an on-device environment. The device 100 may enter the low-power mode based on preset conditions, whereby the power consumption of the device 100 may be reduced.

To enhance the efficiency of speculative decoding in the device 100, which utilizes a single memory (MEM) for both the lower performance model (LM) and the higher performance model (UM), the neural processing unit (NPU) and its memory interface may incorporate specialized hardware logic. These mechanisms are designed to manage the shared memory bus (B) efficiently and accelerate the context switching required between the two models in a time-divisional processing scheme.

In one embodiment, the neural processing unit (NPU) controller (such as NPU controller 1700 in FIG. 10) of the device 100 includes a dual-context hardware manager and a dynamically partitioned NPU memory. The dual-context hardware manager is a specialized circuit configured to maintain the execution state of both the lower performance model (LM) and the higher performance model (UM) simultaneously, including program counters and pointers to their respective attention parameters within the unified memory (MEM). Concurrently, the on-chip NPU memory 1200 is partitioned by the hardware manager into distinct, protected regions for the lower performance model (LM) and the higher performance model (UM). While the neural processing unit's (NPU's) processing element core 1300 executes the generation step for the lower performance model (LM), the dual-context hardware manager initiates a priority-based prefetch operation. This operation signals the memory (MEM) controller to proactively load the required parameters and attention parameters for the upcoming higher performance model (UM) accept or reject operation into the designated UM partition of the NPU memory 1200. The memory controller intelligently interleaves these low-priority prefetch requests with the high-priority memory requests from the active lower performance model (LM), thereby minimizing performance impact. This combination of context management and partitioned caching significantly reduces the context switching overhead.

In another embodiment, to facilitate efficient interoperation of data within the single memory (MEM), the neural processing unit (NPU) is equipped with a hardware attention parameter coherency unit. The lower performance model (LM) and higher performance model (UM) often share identical initial layers, meaning the attention parameters generated from the initial input query are identical for both models. Instead of the higher performance model (UM) redundantly recomputing these values, which would consume valuable memory bandwidth on the single communication bus (B), the coherency unit optimizes this process. When the lower performance model (LM) generates its attention parameters and stores them in the memory (MEM), the coherency unit identifies the memory addresses corresponding to the shared initial query. It then establishes a direct mapping, or a set of pointers, to these shared attention parameters for the higher performance model's (UM's) execution context. This hardware-managed parameter sharing ensures that the higher performance model (UM) begins its accept or reject operation with the necessary data logically available, bypassing redundant memory reads and computations.

Furthermore, the memory access architecture is optimized via a speculative decoding-aware memory interface on the neural processing unit (NPU). This interface is designed to understand the distinct memory access patterns of the two models. The lower performance model (LM), performing its generation operation, issues frequent, small, low-latency memory read requests. The higher performance model (UM), performing its accept or reject operation, issues less frequent, large, high-bandwidth block read requests. The speculative decoding-aware memory interface contains separate hardware queues for LM and UM requests. It applies a quality-of-service (QoS) policy that prioritizes the latency-sensitive requests from the active lower performance model (LM) over the background prefetch requests for the higher performance model (UM), ensuring that the token generation process is not stalled while still preparing for the upcoming context switch. By managing the single memory bus (B) with this intelligent, hardware-based scheduling, the device 100 achieves superior performance and power efficiency in a unified memory architecture.

Figure 4:
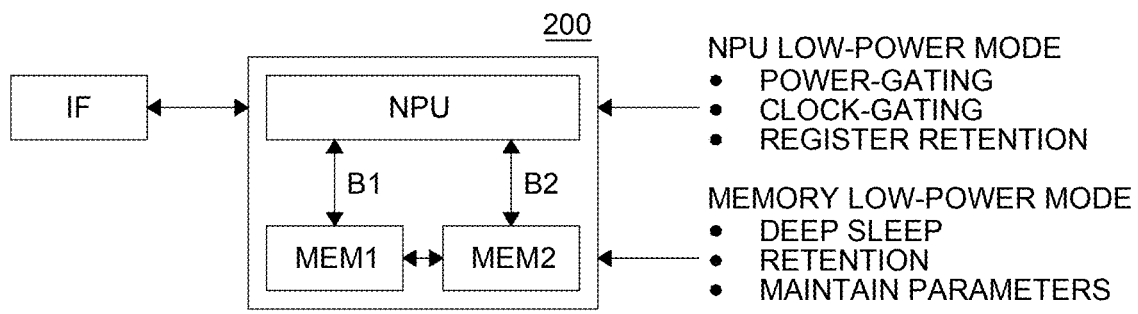
FIG. 4 illustrates a device, according to the second embodiment of the first example of the present disclosure.

FIG. 4 illustrates a device according to the second embodiment of the first example of the present disclosure. In describing FIG. 4, redundant descriptions of FIGS. 1 to 3 may be omitted for ease of explanation. Referring to FIG. 4, a device 200 according to the second embodiment of the first example of the present disclosure includes a neural processing unit (NPU), a first memory (MEM1), and a second memory (MEM2). The device 200 may further include at least one of a communication bus (not shown), a CPU (not shown), a GPU (not shown), and a storage device (not shown).

According to the second embodiment of the first example of the present disclosure, the device 200 is configured to provide hyperscale level of AI services on-device at low-power utilizing speculative decoding. According to the device 200 according to the second embodiment of the first example of the present disclosure, AI services may be provided only on the on-device, thereby protecting the personal information and privacy of the user.

The device 200 according to the second embodiment of the first example of the present disclosure is configured to receive an input query via an interface (IF).

A first communication bus (B1) is provided between the neural processing unit (NPU) and the first memory (MEM1). The first communication bus (B1) may be a dedicated communication bus for the neural processing unit (NPU) and the first memory (MEM1), and may be configured to provide a stable memory bandwidth for speculative decoding.

A second communication bus (B2) is provided between the neural processing unit (NPU) and the second memory (MEM2). The second communication bus (B2) may be a dedicated communication bus for the neural processing unit (NPU) and the second memory (MEM2), and may be configured to provide a stable memory bandwidth for speculative decoding.

The neural processing unit (NPU) of the device 200 according to the second embodiment of the first example of the present disclosure is an application specific integrated circuit (ASIC) implemented as an accelerator dedicated to neural network inference.

The neural processing unit (NPU) of the device 200 according to the second embodiment of the first example of the present disclosure may be configured as a system-on-chip (SoC).

The neural processing unit (NPU) of the device 200 according to the second embodiment of the first example of the present disclosure is configured to perform inference using a higher performance model (UM) and a lower performance model (LM). The higher performance model (UM) and the lower performance model (LM) are configured to cooperate with each other to process speculative decoding. For a description of speculative decoding, refer to FIGS. 1 to 2.

Here, the neural processing unit (NPU) is configured to alternately process the higher performance model (UM) and the lower performance model (LM), i.e., the neural processing unit (NPU) operates to process the higher performance model (UM) and the lower performance model (LM) sequentially. In other words, the neural processing unit (NPU) is operated to process the higher performance model (UM) and the lower performance model (LM) in a time-divisional manner. Thus, the higher performance model (UM) and the lower performance model (LM) can be processed sequentially while increasing the utilization rate of the calculation circuits of the neural processing unit (NPU). Furthermore, the operation of the speculative decoding may not cause a bottleneck in the neural processing unit (NPU) of the device 200 because the higher performance model (UM) and the lower performance model (LM) may be processed sequentially in the neural processing unit (NPU) of the device 200, and the parameters of the higher performance model (UM) and the parameters of the lower performance model (LM) reside in the first memory (MEM1) and the second memory (MEM2), respectively.

According to the second embodiment of the first example of the present disclosure, the first memory (MEM1) of the device 200 stores weight parameters and tokens of the higher performance model (UM) when the device 200 is in operation and the second memory (MEM2) of the device 200 is configured to store the weight parameters and tokens of the lower performance model (LM) when the device 200 is in operation. By storing both the weight parameters of the higher performance model (UM) and the lower performance model (LM) in the first memory (MEM1) and the second memory (MEM2), respectively, the device 200 can efficiently perform the speculative decoding. As will be described further below, the weight parameters of the higher performance model (UM) and the lower performance model (LM) may be substantial in size and may be difficult to store on a single memory chip. In such cases, the device 200 may use a plurality of memory chips or memory devices to increase the capacity of the available memory.

According to the second embodiment of the first example of the present disclosure, the first memory (MEM1) of the device 200 provides the parameters of the higher performance model (UM) to the neural processing unit (NPU) when the neural processing unit (NPU) performs inference using the higher performance model (UM), and the second memory (MEM2) is configured to provide the parameters of the lower performance model (LM) to the neural processing unit (NPU) when the neural processing unit (NPU) performs inference using the lower performance model (LM).

For example, the device 200 may set an address map of each of the first memory (MEM1) and the second memory (MEM2) to allocate memory banks in which the weight parameters of the higher performance model (UM) and the lower performance model (LM) are to be stored during the speculative decoding operation. Thus, in the speculative decoding operation, both the weight parameters of the higher performance model (UM) and the weight parameters of the lower performance model (LM) may be resident in the first memory (MEM1) and the second memory (MEM2).

The first memory (MEM1) of the device 200 according to the second embodiment of the first example of the present disclosure may comprise at least one memory unit (e.g., a bank, etc.). The first memory (MEM1) may comprise a homogeneous memory or a heterogeneous memory.

The second memory (MEM2) of the device 200 according to the second embodiment of the first example of the present disclosure may comprise at least one memory unit (e.g., a bank, etc.). The second memory (MEM2) may comprise a homogeneous memory or a heterogeneous memory.

Accordingly, the capacity of the plurality of memories (MEM1, MEM2) of the device 200 according to the second embodiment of the first example of the present disclosure may be greater than the sum of the weight parameters of the higher performance model (UM) and the lower performance model (LM). Thus, the weight parameters of the higher performance model (UM) and the lower performance model (LM) may reside in the plurality of memories (MEM1, MEM2) to obviate or reduce memory read and memory write operations for speculative decoding.

The device 200 according to the second embodiment of the first example of the present disclosure may be configured to provide low-power functionality for on-device utilization. The low-power mode of the device 200 according to the second embodiment of the first example of the present disclosure may be, for example, a sleep mode, a deep sleep mode, a retention mode, and the like. For example, the neural processing unit (NPU) of the device 200 according to the second embodiment of the first example of the present disclosure may be configured to provide at least one of the following functions: power gating, clock gating, and register retention.

At least one of the first memory (MEM1) and the second memory (MEM2) of the device 200 according to the second embodiment of the first example of the present disclosure may be configured to provide at least one of the following functions: deep sleep, retention, and maintain parameters.

The low-power mode may be activated when the device 200 receives no input queries associated with the speculative decoding for a period of time. The certain amount of time may be provided based on, for example, a timer, counter value, or the like. The low-power mode may be activated based on a certain threshold time, and may be deactivated when an input query for speculative decoding is entered into the device 100.

According to a second embodiment of the first example of the present disclosure, the device 200 may be configured to provide at least one low-power mode while simultaneously providing the speculative decoding in an on-device environment. The device 200 may enter the low-power mode based on preset conditions, whereby the power consumption of the device 200 may be reduced.

To further enhance the efficiency of speculative decoding in the device 200, the neural processing unit (NPU) may incorporate specialized hardware logic to accelerate context switching and optimize data flow between the lower performance model (LM) and the higher performance model (UM). These hardware mechanisms enable a more tightly-coupled and efficient interoperation than is possible with a simple time-divisional processing approach.

In one embodiment, the neural processing unit (NPU) controller (such as NPU controller 1700 in FIG. 10) of the device 200 includes a dual-context hardware manager. This specialized circuit is configured to maintain the execution state of both the lower performance model (LM) and the higher performance model (UM) simultaneously. The state information includes, for each model, the current program counter, pointers to the relevant locations in their respective attention parameters (e.g., Key-Value Caches), and the status of ongoing operations. While the neural processing unit's (NPU's) processing element core 1300 is executing the generation step for the lower performance model (LM) using the first memory (MEM1), the dual-context hardware manager can opportunistically initiate a hardware-managed prefetch operation. This operation utilizes the otherwise idle second communication bus (B2) to proactively load the required parameters and attention parameters for the upcoming accept or reject operation performed by the higher performance model (UM) from the second memory (MEM2) into the NPU memory 1200. By overlapping the higher performance model's (UM's) data-loading latency with the lower performance model's (LM's) computation time, this prefetching mechanism significantly reduces the context switching overhead, allowing the neural processing unit (NPU) to transition from lower performance model (LM) execution to higher performance model (UM) execution with minimal delay.

In another embodiment, to facilitate efficient interoperation of tokens and cached data, the neural processing unit (NPU) is equipped with a hardware attention parameter coherency unit. The lower performance model (LM) and higher performance model (UM) often share identical initial layers. Consequently, the attention parameters generated from the initial input query are identical for both models. Instead of the higher performance model (UM) redundantly recomputing these values, the coherency unit optimizes this process. When the lower performance model (LM) generates its attention parameters and stores them in first memory (MEM1), the coherency unit identifies the portions of the parameters corresponding to the shared initial query. It then orchestrates a direct memory-to-memory transfer or establishes a direct mapping of these shared attention parameters from the first memory (MEM1) to the neural processing unit's (NPU's) context for the higher performance model's (UM's) execution. This hardware-managed parameter sharing ensures that the higher performance model (UM) begins its accept or reject operation with the necessary data already available, bypassing the need to re-process the initial tokens and dramatically accelerating the first accept or reject pass.

Furthermore, the hardware architecture may be optimized by implementing asymmetric memory interfaces for the two models, reflecting their different access patterns. The lower performance model (LM), which performs a generation operation for tokens sequentially, requires frequent, low-latency access to the first memory (MEM1). The higher performance model (UM), which performs an accept or reject operation on a batch of tokens at once, requires high-bandwidth access to the second memory (MEM2) to read a larger block of parameters. Accordingly, the first communication bus (B1) and its corresponding port on the neural processing unit (NPU) can be designed with a wider data path to prioritize low-latency transfers for the lower performance model (LM). In contrast, the second communication bus (B2) and its neural processing unit (NPU) port can be designed with more channels or a higher clock frequency to prioritize high-throughput data transfer for the higher performance model (UM). By tailoring the hardware interfaces to the specific, asymmetric computational demands of the two models in a speculative decoding framework, the device 200 achieves superior performance and power efficiency.

Figure 5:
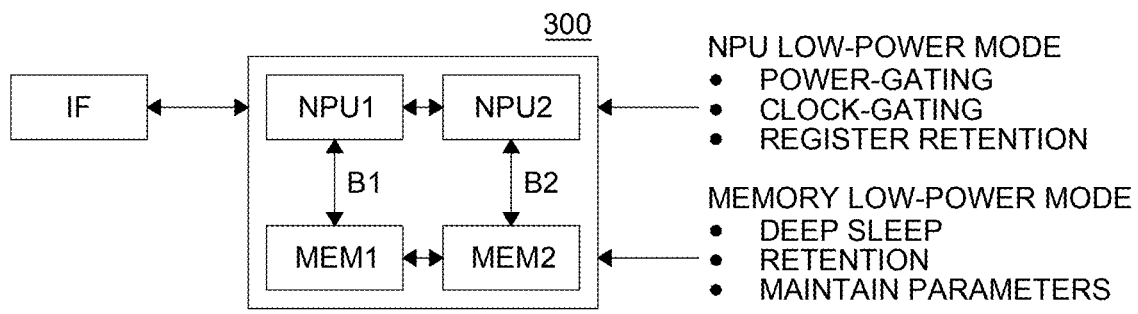
FIG. 5 illustrates a device, according to a third embodiment of the first example of the present disclosure.

FIG. 5 illustrates a device according to a third embodiment of the first example of the present disclosure. In describing FIG. 5, redundant descriptions of FIGS. 1 to 4 may be omitted for ease of explanation. Referring to FIG. 5, a device 300 includes a plurality of neural processing units (NPU1, NPU2), and a plurality of memories (MEM1, MEM2). The device 300 may further include at least one of a communication bus (not shown), a CPU (not shown), a GPU (not shown), and a storage device (not shown).

According to the third embodiment of the first example of the present disclosure, the device 300 is configured to provide hyperscale level of AI services with an on-device at low-power utilizing the speculative decoding.

According to the device 300 according to the third embodiment of the first example of the present disclosure, AI services may be provided only on the on-device, thereby protecting the personal information and privacy of the user.

The device 300 according to the third embodiment of the first example of the present disclosure receives an input query via an interface (IF). A first communication bus (B1) is provided between the first neural processing unit (NPU1) and the first memory (MEM1). The first communication bus (B1) may be a dedicated communication bus for the first neural processing unit (NPU1) and the first memory (MEM1), and may be configured to provide a stable memory bandwidth for speculative decoding. A second communication bus (B2) is provided between the second neural processing unit (NPU2) and the second memory (MEM2). The second communication bus (B2) may be a dedicated communication bus for the second neural processing unit (NPU2) and the second memory (MEM2), and may be configured to provide a stable memory bandwidth for speculative decoding.

A communication channel capable of communicating with each other may be provided between the first neural processing unit (NPU1) and the second neural processing unit (NPU2). A communication channel communicable with each other may be provided between the first memory (MEM1) and the second memory (MEM2). Accordingly, prompts, prefill tokens, accepted tokens, rejected tokens, or generated tokens generated in the speculative decoding may be transmitted.

More specifically, the transmission of this data is managed by hardware controllers within each NPU to ensure operational efficiency. The initial input query (prompt) is distributed to both NPU1 and NPU2, where each unit independently performs its prefill operation. For example, the first neural processing unit (NPU1), executing the higher performance model (UM), stores its resulting initial attention parameters in its local memory, the first memory (MEM1). Concurrently, the second neural processing unit (NPU2), executing the lower performance model (LM), stores its initial attention parameters in its local memory, the second memory (MEM2).

Following the prefill stage, the second neural processing unit (NPU2) executes a generation operation to produce a sequence of candidate tokens, which are stored in the second memory (MEM2). To transmit these tokens for validation, the controller in the second neural processing unit (NPU2) initiates a direct memory access (DMA) transfer. The DMA unit reads the block of generated tokens from the second memory (MEM2) and sends it across the dedicated communication channel to the first neural processing unit (NPU1), where it is written into the first memory (MEM1). This makes the candidate tokens available to the higher performance model (UM).

Subsequently, first neural processing unit (NPU1) performs the accept or reject operation on the candidate tokens. The result, comprising the validated sequence of tokens, is stored in the first memory (MEM1). To communicate this result back to the lower performance model (LM) for the next generation step, the controller in the first neural processing unit (NPU1) initiates another DMA transfer. This DMA transfer reads the validation result from the first memory (MEM1) and transmits it back across the communication channel to the second neural processing unit (NPU2), where it is written into the second memory (MEM2). The use of DMA for these block transfers is critical, as it offloads the data movement task from the main processing element cores of the NPUs, thereby enabling an efficient, parallel speculative decoding workflow.

The plurality of neural processing units (NPU1, NPU2) of the device 300 according to the third embodiment of the first example of the present disclosure are application specific integrated circuits (ASICs) implemented as accelerators dedicated to neural network inference.

The plurality of neural processing units (NPU1, NPU2) of the device 300 according to the third embodiment of the first example of the present disclosure may be configured as a system-on-chip (SoC).

According to the device 300 of the third embodiment of the first example of the present disclosure, the first neural processing unit (NPU1) is configured to make inference using a higher performance model (UM) and the second neural processing unit (NPU2) is configured to make inference using a lower performance model (LM). The higher performance model (UM) and the lower performance model (LM) are configured to cooperate with each other to process speculative decoding, as described above with reference to FIGS. 1 to 2.

The first neural processing unit (NPU1) is set to process the higher performance model (UM), and the second neural processing unit (NPU2) is set to process the lower performance model (LM), respectively. In other words, the plurality of neural processing units (NPU1, NPU2) operates to process the higher performance model (UM) and the lower performance model (LM) in parallel. In other words, the plurality of neural processing units (NPU1, NPU2) are operated to process the higher performance model (UM) and the lower performance model (LM) independently. Thus, the plurality of neural processing units (NPU1, NPU2) may cooperate with each other to efficiently process the higher performance model (UM) and the lower performance model (LM). Furthermore, the operation of the speculative decoding may avoid or alleviate a bottleneck in the plurality of neural processing units (NPU1, NPU2) of the device 200 because the higher performance model (UM) and the lower performance model (LM) are processed in parallel or simultaneously in the plurality of neural processing units (NPU1, NPU2) of the device 200, and the parameters of the higher performance model (UM) and the lower performance model (LM) reside in the first memory (MEM1) and the second memory (MEM2), respectively.

According to the third embodiment of the first example of the present disclosure, the first memory (MEM1) of the device 300 is configured to store weight parameters and tokens of the higher performance model (UM) when the device 300 is in operation.

According to the third embodiment of the first example of the present disclosure, the second memory (MEM2) of the device 300 is configured to store the weight parameters and tokens of the lower performance model (LM) when the device 300 is in operation. By storing both the weight parameters of the higher performance model (UM) and the lower performance model (LM) in the first memory (MEM1) and the second memory (MEM2), the device 300 can efficiently process speculative decoding. As will be described further, the weight parameters of the higher performance model (UM) and the lower performance model (LM) may be substantial in size and may be difficult to store on a single memory chip. In such cases, the device 300 may configure a plurality of memories to increase the capacity of the memory.

According to the third embodiment of the first example of the present disclosure, the first memory (MEM1) of the device 300 is configured to provide the parameters of the higher performance model (UM) to the first neural processing unit (NPU1) when the first neural processing unit (NPU1) makes inference using the higher performance model (UM), and the second memory (MEM2) is configured to provide the parameters of the lower performance model (LM) to the second neural processing unit (NPU2) when the second neural processing unit (NPU2) infers the lower performance model (LM).

For example, the device 300 may set an address map of each of the first memory (MEM1) and the second memory (MEM2) to allocate memory banks in which the weight parameters of the higher performance model (UM) and the lower performance model (LM) are to be stored during the speculative decoding operation. Thus, in the speculative decoding operation, both the weight parameters of the higher performance model (UM) and the lower performance model (LM) may be resident in the first memory (MEM1) and the second memory (MEM2).

The first memory (MEM1) of the device 300 according to the third embodiment of the first example of the present disclosure may comprise at least one memory unit (e.g., a bank, etc.). The first memory (MEM1) may comprise a homogeneous memory or a heterogeneous memory.

The second memory (MEM2) of the device 300 according to the third embodiment of the first example of the present disclosure may comprise at least one memory unit (e.g., a bank, etc.). The second memory (MEM2) may comprise a homogeneous memory or a heterogeneous memory.

Accordingly, the capacity of the plurality of memories (MEM1, MEM2) of the device 300, according to the third embodiment of the first example of the present disclosure is configured to be greater than the sum of the weight parameters of the higher performance model (UM) and the lower performance model (LM). Thus, the weight parameters of the higher performance model (UM) and the lower performance model (LM) may reside in the plurality of memories (MEM1, MEM2) to reduce memory read and memory write operations for speculative decoding. Accordingly, the token generation rate of the conventional device becomes slower than the token generation rate of the device 300, according to the third embodiment of the first example of the present disclosure.

The device 300 according to the third embodiment of the first example of the present disclosure may be configured to provide low-power functionality for on-device utilization. The low-power mode of the device 300 according to the third embodiment of the first example of the present disclosure may be, for example, a sleep mode, a deep sleep mode, a retention mode, and the like. For example, the neural processing unit (NPU) of the device 300 according to the third embodiment of the first example of the present disclosure may be configured to provide at least one of the following functions: power gating, clock gating, and register retention.

At least one of the first memory (MEM1) and the second memory (MEM2) of the device 300 according to the third embodiment of the first example of the present disclosure may be configured to provide at least one of the following functions: deep sleep, retention, and maintain parameters.

The low-power mode may be activated when the device 300 receives no input queries for speculative decoding for a period of time. The certain amount of time may be provided based on, for example, a timer, counter value, or the like. The low-power mode may be activated based on a certain threshold time, and may be deactivated when an input query for speculative decoding is entered into the device 100.

Referring again to FIG. 2, when the first neural processing unit (NPU1) performs a prefill operation or an accept or reject operation of the higher performance model (UM), the second neural processing unit (NPU2) and the second memory (MEM2) may be in a low-power mode. Conversely, when the second neural processing unit (NPU2) performs the prefill operation or the generation operation of the lower performance model (LM), the first neural processing unit (NPU1) and the first memory (MEM1) may be in a low-power mode. However, the respective memories may preserve data in order to perform the speculative decoding.

According to a third embodiment of the first example of the present disclosure, the device 300 may be configured to provide at least one low-power mode while simultaneously providing speculative decoding in an on-device environment. The device 300 may enter the low-power mode based on preset conditions, whereby the power consumption of the device 300 may be reduced.

Figure 6:
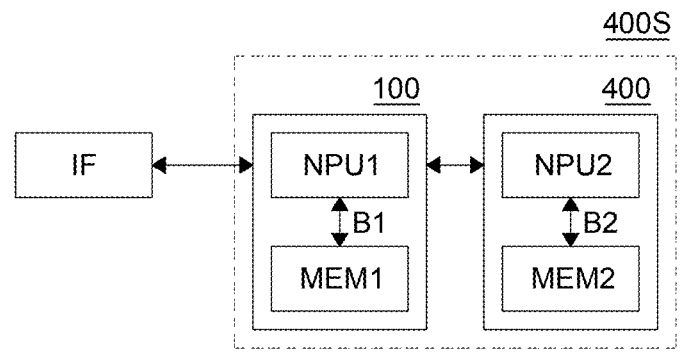
FIG. 6 illustrates a system, according to the first embodiment of the second example of the present disclosure.

FIG. 6 illustrates a system according to the first embodiment of the second example of the present disclosure. In describing FIG. 6, redundant descriptions of FIGS. 1 to 5 may be omitted for ease of explanation. Referring to FIG. 6, a system 400S according to the first embodiment of the second example of the present disclosure includes a device 100 and a server 400. The system 400S, including the device 100 and the server 400, is configured to utilize speculative decoding to process federated operations between neural network models.

The device 100 may be one of the devices (100, 200, 300) of the first example of the present disclosure. The device 100 includes a first neural processing unit (NPU1) and a first memory (MEM1). The device 100 may further include at least one of a communication bus (not shown), a CPU (not shown), a GPU (not shown), and a storage device (not shown).

The server 400 is an on-premise server. The server 400 may be designed to have a computing power of, for example, 100 TOPS, 250 TOPS, 5,000 TOPS, 10,000 TOPS, etc. For example, a neural processing unit (NPU) may be designed to have a computing power of 100 TOPS to 10,000 TOPS. Unlike cloud-based servers, on-premises servers are located in a data center, office, or dedicated server room of an organization, business, or institution. This allows direct control over hardware, software, security settings, and more.

The server 400 may include at least one neural processing unit (NPU) and elements of various electronic systems. The server 400 may include digital circuitry, analog circuitry, mixed signal, and radio frequency processing circuitry. For example, a processor that may be further included in the server 400 may be at least one of a central processing unit (CPU), a digital signal processor (DSP), an image signal processor (ISP), and a graphics processing unit (GPU). The server 400 may include at least one memory. The server 400 may include a high-speed data bus for efficient communication between the various circuit components. The server 400 may include at least one interface, such as PCIe, USB, I2C, SPI, UART, GPIO, for connectivity with external devices and sensors. The server 400 may include an on-chip power management unit to regulate voltage and power distribution of the server 400. The server 400 may include communication interfaces that integrate wired and wireless communication protocols such as Ethernet, Wi-Fi, Bluetooth, and cellular connectivity for data transfer.

The server 400 includes a second neural processing unit (NPU2) and a second memory (MEM2). The server 400 may further include at least one of a communication bus (not shown), a CPU (not shown), a GPU (not shown), and a storage device (not shown).

According to the first embodiment of the second example of the present disclosure, the system 400S is configured to provide hyperscale level of AI services with an on-device at low-power utilizing speculative decoding. According to the system 400S according to the first embodiment of the second example of the present disclosure, AI services may be provided only on the on-premises server, thereby protecting the personal information and privacy of the user. The system 400S according to the first embodiment of the second example of the present disclosure is configured to receive an input query via an interface (IF).

A first communication bus (B1) is provided between the first neural processing unit (NPU1) and the first memory (MEM1). The first communication bus (B1) may be a dedicated communication bus for the first neural processing unit (NPU1) and the first memory (MEM1), and may be configured to provide a stable memory bandwidth for speculative decoding. A second communication bus (B2) is provided between the second neural processing unit (NPU2) and the second memory (MEM2). The second communication bus (B2) may be a dedicated communication bus for the second neural processing unit (NPU2) and the second memory (MEM2), and may be configured to provide a stable memory bandwidth for speculative decoding.

In an embodiment, the first communication bus (B1) and the second communication bus (B2) are configured as asymmetric memory interfaces, with distinct hardware characteristics tailored to the different computational demands of the lower performance model (LM) and the higher performance model (UM).

Specifically, the first neural processing unit (NPU1) on the device executes the lower performance model (LM), which performs a generation operation that produces tokens sequentially. This task requires frequent, small, and latency-sensitive memory accesses to read context and write newly generated tokens. Therefore, the first communication bus (B1) is preferably optimized for low latency. This can be achieved through a wider data path for single-word transactions or a bus protocol that minimizes handshake overhead, ensuring that the first neural processing unit (NPU1) can generate tokens with minimal delay.

Conversely, the second neural processing unit (NPU2) on the on-premises server executes the higher performance model (UM), which performs an accept or reject operation on a batch of candidate tokens. This task is dominated by reading large blocks of the model's parameters from the second memory (MEM2) and is therefore sensitive to overall throughput. Accordingly, the second communication bus (B2) is preferably optimized for high bandwidth. This can be achieved by implementing more memory channels, a higher bus clock frequency, or support for efficient burst-mode data transfers.

By designing the communication buses (B1 and B2) with these asymmetric, workload-aware characteristics, the overall system (400S) achieves superior performance and power efficiency for the federated speculative decoding task, as each bus is purpose-built for its specific role in the algorithm.

The plurality of neural processing units (NPU1, NPU2) of the system 400S according to the first embodiment of the second example of the present disclosure are application specific integrated circuits (ASICs) implemented as accelerators dedicated to neural network inference.

The system 400S according to the first embodiment of the second example of the present disclosure is configured to receive an input query via the interface (IF). The input query may first be transmitted to the server 400 to initiate speculative decoding. However, the first embodiment of the second example of the present disclosure is not limited thereto, and the device 100 may process the speculative decoding only on the device 100. In such a case, the accuracy of the answer generated by the device 100 may be reduced, but the answer may be generated quickly. Alternatively, the answer can be generated by the device 100 even if communication with the server 400 is lost.

According to the first embodiment of the second example of the present disclosure, the device 100 of the system 400S may be configured as a system on a chip (SoC) and the server 400 may be configured as an on-premises server.

A communication channel may be provided between the device 100 and the server 400 that allows them to communicate with each other. Accordingly, prompts, prefill tokens, accepted tokens, rejected tokens, or generated tokens generated from speculative decoding may be transmitted.

According to the system 400S of the first embodiment of the second example of the present disclosure, the first neural processing unit (NPU1) is configured to perform inference using a higher performance model (UM) and the second neural processing unit (NPU2) is configured to perform inference using a lower performance model (LM). The higher performance model (UM) and the lower performance model (LM) are configured to cooperate with each other to process speculative decoding, as described above with reference to FIGS. 1 to 2.

The first neural processing unit (NPU1) processes the higher performance model (UM), and the second neural processing unit (NPU2) processes the lower performance model (LM), respectively. In other words, the plurality of neural processing units (NPU1, NPU2) operate to process the higher performance model (UM) and the lower performance model (LM) in parallel and independently. Thus, the plurality of neural processing units (NPU1, NPU2) may cooperate with each other to efficiently process the higher performance model (UM) and the lower performance model (LM). Furthermore, the operation of the speculative decoding may obviate or eliminate a bottleneck in the plurality of neural processing units (NPU1, NPU2) of the system 400S because the higher performance model (UM) and the lower performance model (LM) may be processed in parallel by the plurality of neural processing units (NPU1, NPU2) of the system 400S, and the parameters of the higher performance model (UM) and the lower performance model (LM) reside in the first memory (MEM1) and the second memory (MEM2), respectively.

According to the first embodiment of the second example of the present disclosure, the first memory (MEM1) of the device 100 is configured to store weight parameters and tokens of the lower performance model (LM) when the device 100 is in operation. According to the first embodiment of the second example of the present disclosure, the second memory (MEM2) of the server 400 is configured to store the weight parameters and tokens of the higher performance model (UM) when the server 400 is in operation. By storing both the weight parameters of the higher performance model (UM) and the lower performance model (LM) in the first memory (MEM1) and the second memory (MEM2), the system 400S can efficiently process speculative decoding. As will be described further, the weight parameters of the higher performance model (UM) and the weight parameters of the lower performance model (LM) may be substantial in size and may be difficult to store on a single memory chip. In such cases, the system 400S may configure a plurality of memory chips or memory devices to increase the capacity of the available memory.

According to the first embodiment of the second example of the present disclosure, the first memory (MEM1) of the system 400S is configured to provide the parameters of the lower performance model (LM) to the first neural processing unit (NPU1) when the first neural processing unit (NPU1) performs inference using the lower performance model (LM), and the second memory (MEM2) is configured to provide the parameters of the higher performance model (UM) to the second neural processing unit (NPU2) when the second neural processing unit (NPU2) performs inference using the higher performance model (UM).

For example, the system 400S may set an address map of each of the first memory (MEM1) and the second memory (MEM2) to allocate memory banks in which the weight parameters of the higher performance model (UM) and the lower performance model (LM) are to be stored during the speculative decoding operation. Thus, in the speculative decoding operation, both the weight parameters of the higher performance model (UM) and the weight parameters of the lower performance model (LM) may be resident in the first memory (MEM1) and the second memory (MEM2).

The first memory (MEM1) of the system 400S according to the first embodiment of the second example of the present disclosure may comprise at least one memory unit (e.g., a bank, etc.). The first memory (MEM1) may comprise a homogeneous memory or a heterogeneous memory. The second memory (MEM2) of the system 400S according to the first embodiment of the second example of the present disclosure may comprise at least one memory unit (e.g., a bank, etc.). The second memory (MEM2) may comprise a homogeneous memory or a heterogeneous memory.

Accordingly, the capacity of the plurality of memories (MEM1, MEM2) of the system 400S according to the first embodiment of the second example of the present disclosure is configured to be greater than the sum of the weight parameters of the higher performance model (UM) and the lower performance model (LM). Thus, the weight parameters of the higher performance model (UM) and the lower performance model (LM) may reside in the plurality of memories (MEM1, MEM2) to reduce memory read and memory write operations for speculative decoding.

The first device 100 according to the first embodiment of the second example of the present disclosure may be configured to provide a low-power function for on-device utilization. The low-power mode of the system 400S according to the first embodiment of the second example of the present disclosure may be, for example, a sleep mode, a deep sleep mode, a retention mode, and the like. For example, the plurality of neural processing units (NPU1, NPU2) of the system 400S according to the first embodiment of the second example of the present disclosure may be configured to provide at least one of the following functions: power gating, clock gating, and register retention.

A plurality of memories (MEM1, MEM2) of the system 400S according to the first embodiment of the second example of the present disclosure may be configured to provide at least one of the following functions: deep sleep, retention, and maintain parameters.

The low-power mode may be activated when the device 100 receives no input queries associated with speculative decoding for a period of time. The certain amount of time may be provided based on, for example, a timer, counter value, or the like. The low-power mode may be activated based on a certain threshold time, and may be deactivated when an input query for speculative decoding is entered into the device 100.

Referring again to FIG. 2, when the second neural processing unit (NPU2) performs a prefill operation or an accept or reject operation of the higher performance model (UM), the first neural processing unit (NPU1) and the first memory (MEM1) may be in a low-power mode. Conversely, when the first neural processing unit (NPU1) performs the prefill operation or the generation operation of the lower performance model (LM), the second neural processing unit (NPU2) and the second memory (MEM2) may be in a low-power mode. However, the respective memories may preserve data in order to perform the speculative decoding.

The system 400S according to the first embodiment of the second example of the present disclosure may be configured to provide at least one low-power mode while simultaneously providing speculative decoding in an on-premises server environment. The system 400S may enter the low-power mode based on preset conditions, whereby the power consumption of the system 400S may be reduced.

Figure 7:
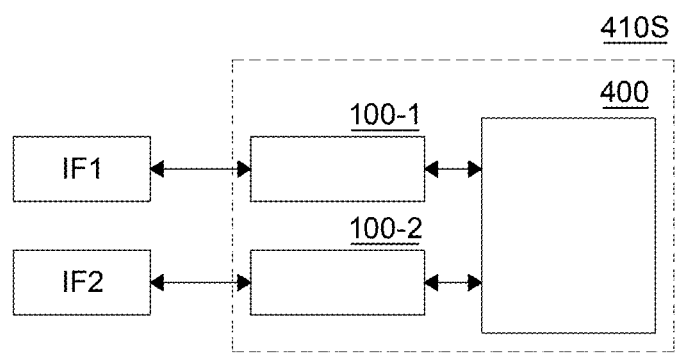
FIG. 7 illustrates a system, according to the second embodiment of the second example of the present disclosure.

FIG. 7 illustrates a system according to the second embodiment of the second example of the present disclosure. In describing FIG. 7, redundant descriptions of FIGS. 1 to 6 may be omitted for ease of explanation. Referring to FIG. 7, a system 410S according to a second embodiment of a second example of the present disclosure includes a plurality of devices 100-1, 100-2 and a server 400. The system 410S, including the plurality of devices 100-1, 100-2 and the server 400, is configured to utilize speculative decoding to process federated operation between neural network models.

Each of the devices 100-1, 100-2 may be substantially the same device as one of the devices described in the first or second examples of the present disclosure.

The server 400 is an on-premise server. The server 400 includes at least one neural processing unit (not shown) and at least one memory (not shown). The number of neural processing units and memories included in the server 400 may vary according to the number of plurality of devices associated with the server 400. The server 400 may further include at least one of a communication bus (not shown), a CPU (not shown), a GPU (not shown), and a storage device (not shown).

According to the second embodiment of the second example of the present disclosure, the system 410S is configured to provide hyperscale level of AI services with a plurality of on-devices at low-power utilizing speculative decoding.

According to the system 410S according to the second embodiment of the second example of the present disclosure, AI services may be provided only on the on-premises server, thereby protecting the personal information and privacy of the user.

The system 410S according to a second example embodiment of the present disclosure is configured to receive at least one input query via a plurality of interfaces (IF1, IF2). The input query may first be sent to the server 400 to initiate speculative decoding. However, the second embodiment of the second example of the present disclosure is not limited thereto, and it is also possible that the speculative decoding can be processed by at least one device among the plurality of devices 100-1, 100-2. In such a case, the accuracy of the answer generated by the device may be reduced, but the answer may be generated quickly. Alternatively, the answer may be generated on the device even if communication with the server 400 is lost.

According to a second example embodiment of the present disclosure, each of the plurality of devices 100-1, 100-2 of the system 410S may be configured as a system-on-chip (SoC) and the server 400 may be configured as an on-premises server.

According to a second example embodiment of the present disclosure, each of the plurality of devices 100-1, 100-2 of the system 410S is configured to perform inference using the first lower performance model (LM1) and the second lower performance model (LM2), respectively, and the server 400 is configured to perform inference using the higher performance model (UM). The higher performance model (UM) and the first lower performance model (LM1) and the second lower performance model (LM2) are configured to cooperatively process speculative decoding, as described with reference to FIGS. 1, 2 and 8.

The first device 100-1 is set to process the first lower performance model (LM1), the second device 100-2 is set to process the second lower performance model (LM2), and the server 400 is set to process the higher performance model (UM). That is, each of the devices 100-1, 100-2 processes a respective lower performance model (LM1, LM2), and the server 400 operates to process the higher performance model (UM) corresponding to the plurality of lower performance models (LM1, LM2).

The memory (not shown) of the first device 100-1 according to the second embodiment of the second example of the present disclosure is configured to store the weight parameters and tokens of the first lower performance model (LM1) when the first device 100-1 is in operation.

The memory (not shown) of the second device 100-2 according to the second embodiment of the second example of the present disclosure is configured to store the weight parameters and tokens of the second lower performance model (LM2) when the second device 100-2 is in operation.

The memory (not shown) of the server 400 according to the second embodiment of the second example of the present disclosure is configured to store the weight parameters and tokens of the higher performance model (UM) when the server 400 is in operation.

According to a second embodiment of the second example of the present disclosure, the plurality of devices 100-1, 100-2 may each be configured to provide low-power functionality for on-device utilization.

The low-power mode of the plurality of devices 100-1, 100-2 according to the second example embodiment of the present disclosure may be, for example, a sleep mode, a deep sleep mode, a retention mode, and the like. For example, the neural processing unit (not shown) of the first device 100-1 or the second device 100-2 according to the second embodiment of the second example of the present disclosure may be configured to provide at least one of the following functions: power gating, clock gating, and register retention.

For example, the memory (not shown) of the first device 100-1 or the second device 100-2 according to a second embodiment of the second example of the present disclosure may be configured to provide at least one of the following functions: deep sleep, retention, and maintain parameters.

For example, the at least one neural processing unit (not shown) of the server 400 according to the second embodiment of the second example of the present disclosure may be configured to provide at least one of the following functions: power gating, clock gating, and register retention.

For example, the at least one memory (not shown) of the server 400 according to a second embodiment of the second example of the present disclosure may be configured to provide at least one of the following functions: deep sleep, retention, and maintain parameters.

The low-power mode may be activated when no input queries for speculative decoding are input to the system 410S for a certain amount of time. The low-power mode may be activated based on a certain threshold time, and may be deactivated when an input query for speculative decoding is entered into the system 410S.

Referring again to FIGS. 2 and 8, when the server 400 performs a prefill operation or an accept or reject operation of the higher performance model (UM), the neural processing units (not shown) and memory (not shown) of the plurality of devices 100-1, 100-2 may be in a low-power mode. Conversely, when the first device 100-1 performs the prefill operation or the generation operation of the first lower performance model (LM1), the second device 100-2 may be in a low-power mode.

The system 410S according to a second embodiment of the second example of the present disclosure may be configured to provide at least one low-power mode while simultaneously providing speculative decoding in an on-premises server environment. The system 410S according to the second embodiment of the second example of the present disclosure can efficiently process speculative decoding via a plurality of devices 100-1, 100-2 and the server 400, and each of the devices 100-1, 100-2 can be independently activated (e.g., in wake-up mode) or deactivated (e.g., in low-power mode).

Figure 8:
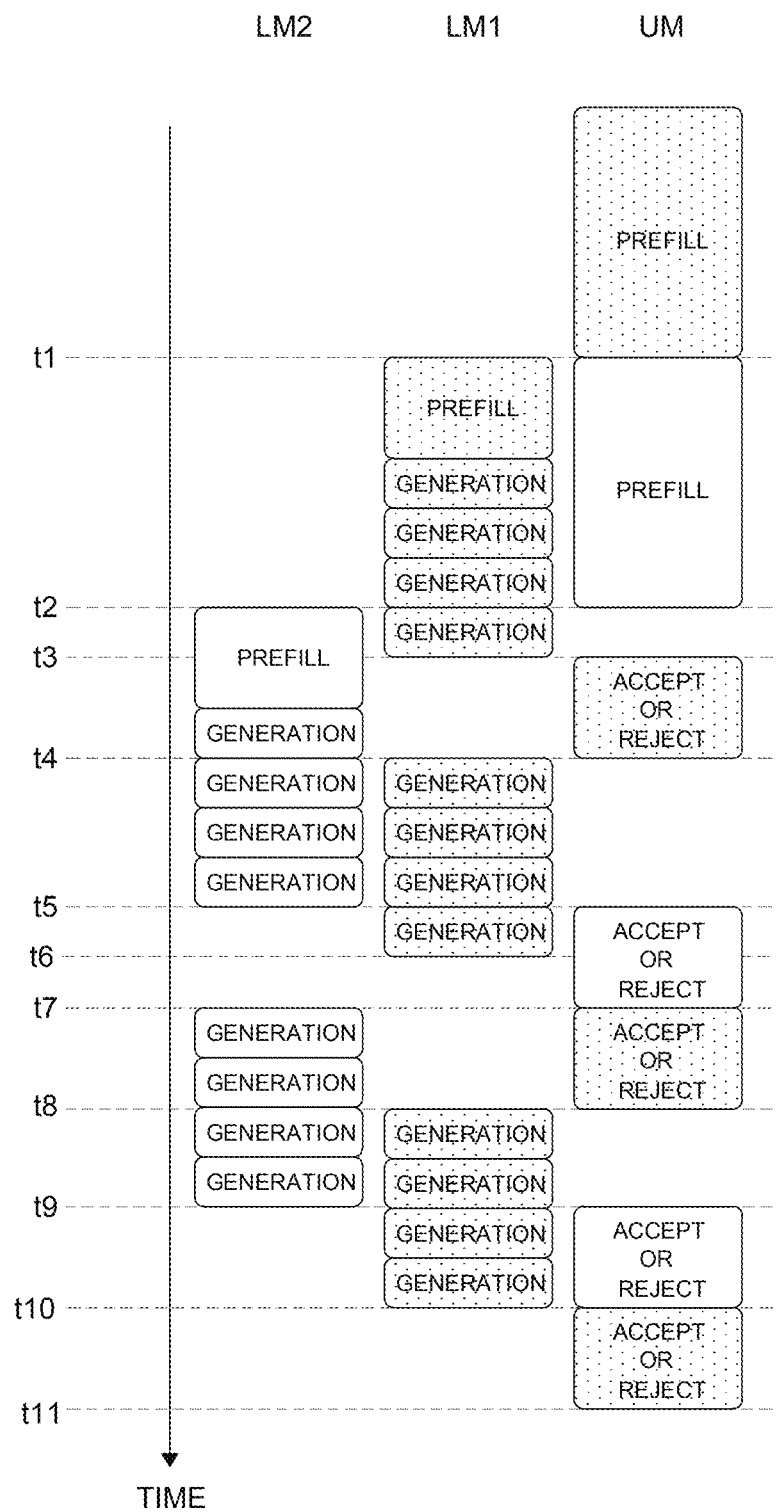
FIG. 8 schematically illustrates a speculative decoding operation, according to the second example of the present disclosure.

FIG. 8 schematically illustrates a speculative decoding operation according to the second example of the present disclosure. In describing FIG. 8, duplication of the description of FIG. 2 may be omitted for ease of explanation. Referring to FIGS. 7 and 8, a plurality of lower performance models (LM1, LM2) and a higher performance model (UM) are illustrated. A system 410S according to a second example of the present disclosure includes a plurality of devices (100-1, 100-2) and a server 400. Each of the devices (100-1, 100-2) is associated with a respective corresponding interface (IF1, IF2). The system 410S may be configured to process the plurality of lower performance models (LM1, LM2) and the higher performance model (UM) sequentially or in parallel for speculative decoding.

The higher performance model (LM) of the server 400 receives each input query sequentially via the plurality of devices (100-1, 100-2). Next, the server 400 sequentially processes a first speculative decoding and a second speculative decoding. Referring to FIG. 8, the boxes in the hatching filled with dots correspond to operations for first speculative decoding, and the boxes without dots correspond to operations for second speculative decoding.

For convenience in the following description, reference will be made to points (T1 to T8) on the time axis. The server 400 utilizes the higher performance model (UM) to process a prefill operation corresponding to the first speculative decoding, and transmits the result of the prefill operation corresponding to the first speculative decoding to the first device 100-1 (T1). Next, the server 400 utilizes the higher performance model (UM) to process a prefill operation corresponding to the second speculative decoding, and transmits the result of the prefill operation corresponding to the second speculative decoding to the second device 100-2 (T2). At this time, the first device 100-1 receives the result of the prefill operation of the higher performance model (UM) corresponding to the first speculative decoding (T1), and utilizes the first lower performance model (LM1) to process the prefill operation and a series of generation operations corresponding to the first speculative decoding to generate a series of token candidates, and transmits them to the server 400 (T3). The server 400 receives the candidate tokens corresponding to the first speculative decoding generated by the first device 100-1 (T3), and utilizes the higher performance model (UM) to accept or reject the candidate tokens corresponding to the first speculative decoding (T4). Meanwhile, the second device 100-2 receives the result of the prefill operation of the higher performance model (UM) corresponding to the second speculative decoding (T2), and utilizes the second lower performance model (LM2) to process the prefill operation and a series of generation operations corresponding to the second speculative decoding to generate a series of token candidates, and transmits them to the server 400 (T5).

Meanwhile, the first device 100-1 receives the accept or reject operation result of the higher performance model (UM) corresponding to the first speculative decoding (T4), and utilizes the first lower performance model (LM1) to process a series of generation operations corresponding to the first speculative decoding to generate a series of additional tokens candidates, and transmits them to the server 400 (T6). The server 400 receives the candidate tokens generated by the second device 100-2 corresponding to the second speculative decoding (T5), and utilizes the higher performance model (UM) to accept or reject the candidate tokens corresponding to the second speculative decoding (T7). A delay of the operation corresponding to the first speculative decoding in the server 400 may occur. Specifically, the accept or reject operation corresponding to the second speculative decoding may be delayed from the start time (T5) to the end time (T7). In other words, the operation of the corresponding higher performance model (UM) may be delayed from the time (T6) to the time (T7) when the first device 100-1 transmits to the server 400 a series of token candidates generated utilizing the first lower performance model (LM1).

Next, the server 400 transmits the accept or reject results of the token candidates corresponding to the second speculative decoding to the second device 100-2 (T7). At this time, the second device 100-2 receives the accept or reject result of the higher performance model (UM) corresponding to the second speculative decoding (T7) and, utilizing the second lower performance model (LM2), processes a series of generation operations corresponding to the second speculative decoding to generate a series of token candidates and transmits them to the server 400 (T9). Then, the server 400 uses the higher performance model (UM) from the point in time (T7) after the point in time (T6) when it receives a series of token candidates generated by the first device 100-1 as the first lower performance model (LM1) to process the accept or delay operation corresponding to the first speculative decoding, and transmit the accept or reject result to the first device 100-1 (T8).

Next, the first device 100-1 receives the accept or reject result of the higher performance model (UM) corresponding to the first speculative decoding (T8) and, utilizing the first lower performance model (LM1), processes a series of generation operations corresponding to the first speculative decoding to generate a set of token candidates, which are transmitted to the server 400 (T10).

The server 400 receives the candidate tokens generated by the second device 100-2 corresponding to the second speculative decoding (T9), and utilizes the higher performance model (UM) to accept or reject the candidate tokens corresponding to the second speculative decoding (T10). Next, the server 400 receives the candidate tokens generated by the first device 100-1 corresponding to the first speculative decoding (T10), and accept or reject the candidate tokens corresponding to the first speculative decoding utilizing the higher performance model (UM) (T11).

The above steps are repeated until the stopping conditions are met.

According to the system 410S according to the second embodiment of the second example of the present disclosure, the system 410S can efficiently process speculative decoding utilizing the plurality of devices 100-1, 100-2 and the server 400. Further, the server 400 can efficiently collaborate with the plurality of devices 100-1, 100-2 in a batch fashion to perform speculative decoding.

Referring to FIG. 8, the number of parameters of the higher performance model (UM) is larger than the number of parameters of the first lower performance model (LM1) or the second lower performance model (LM2). That is, the numbers of parameters of the heterogeneous language models are different. The processing time of the prefill step of the higher performance model (UM) tend to be longer than the processing time of the prefill step of the lower performance model (LM). The processing time of the accept or reject step of the higher performance model (UM) tend to be longer than the processing time of the generation step of the lower performance model (LM). Accordingly, a larger number of token generation in the lower performance model may improve the token generation speed of the system.

The lower performance models may utilize a language model with a determined number of parameters that takes into account the hardware resource constraints of the on-device being processed. The higher performance model may utilize a language model with a number of parameters that takes into account hardware resource constraints of the device being processed.

In some examples, the lower performance model may be a pruned model of the parameters of the higher performance model. For example, the lower performance model may be a pruned model of the parameters of the higher performance model. In such cases, the parameters of the pruned neural network model may be lightweight and may use less memory bandwidth than the higher performance model.

Figure 9:
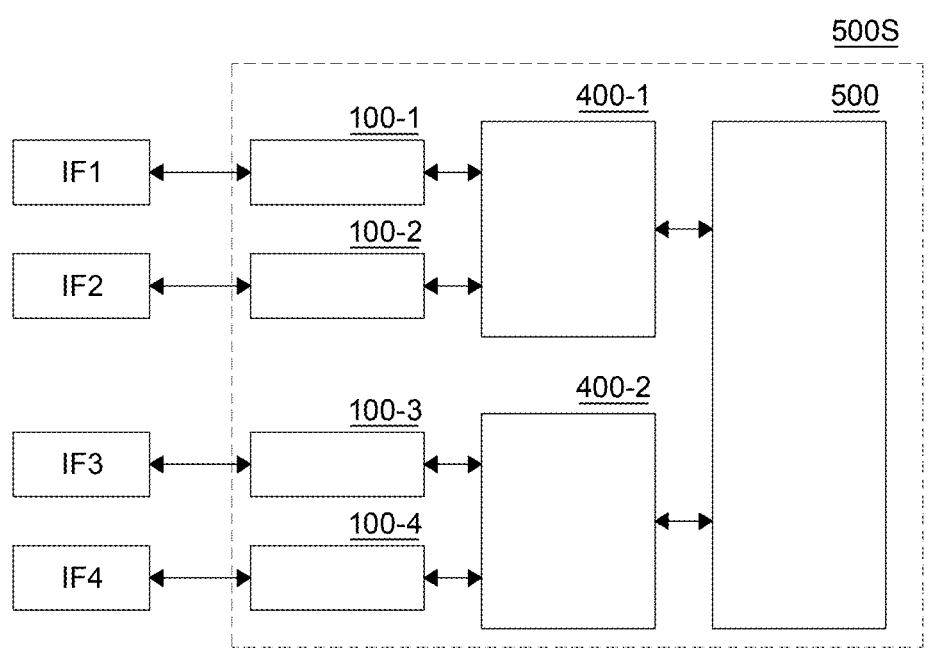
FIG. 9 illustrates a system, according to a third example of the present disclosure.

FIG. 9 illustrates a system according to a third example of the present disclosure. In FIG. 9, redundant descriptions of FIGS. 1 to 8 are omitted for ease of explanation. Referring to FIG. 9, a system 500S according to a third example of the present disclosure includes a plurality of devices 100-1, 100-2, 100-3, 100-4, a plurality of on-premises servers 400-1, 400-2, and a cloud server 500. The system 500S including the plurality of devices 100-1, 100-2, 100-3, 100-4, the plurality of on-premises servers 400-1, 400-2, and the cloud server 500 is configured to utilize speculative decoding to process federated operations between neural network models.

Each of the plurality of devices 100-1, 100-2, 100-3, 100-4 may be a device substantially identical to one of the devices described in the first or second examples of the present disclosure.

Each of the plurality of on-premises servers 400-1, 400-2 may be a device substantially identical to the server described in the second example of the present disclosure.

The cloud server 500 includes at least one neural processing unit (not shown) and at least one memory (not shown). The number of neural processing units and memory included in the cloud server 500 may vary according to the number of a plurality of on-premises servers associated with the cloud server 500. The cloud server 500 may further include at least one of a communication bus (not shown), a CPU (not shown), a GPU (not shown), and a storage device (not shown). The cloud server 500 may be configured to communicate with the plurality of on-premises servers 400-1, 400-2 via a wired or wireless communication network. The cloud server 500 may be designed to have a computing power of, for example, 10,000 TOPS, to 100,000 TOPS.

According to the third example of the present disclosure, the system 500S is configured to provide hyperscale level of AI services across a plurality of on-devices at low-power utilizing speculative decoding.

The system 500S according to a third example of the present disclosure is configured to receive at least one input query via a plurality of interfaces (IF1, IF2, IF3, IF4). The input query may first be transmitted to a corresponding on-premises server to initiate speculative decoding. However, the third example of the present disclosure is not limited thereto, and at least one of the plurality of devices 100-1, 100-2, 100-3, 100-4 may process the speculative decoding only on the device. In such a case, the accuracy of the answer generated by the device may be reduced, but the answer may be generated quickly. Alternatively, the answer can be generated on the device even if communication with the corresponding on-premises server is lost. However, the third example of the present disclosure is not limited thereto, and at least one of the plurality of devices 100-1, 100-2, 100-3, 100-4 may only process speculative decoding up to the on-premises server, i.e., the cloud server 500 may be selectively excluded. In such a case, the accuracy of the answer generated by the apparatus may be reduced, but the answer may be generated quickly. Alternatively, the on-premises server may generate the answer even if communication with the cloud server 500 is lost.

Each of the plurality of devices 100-1, 100-2, 100-3, 100-4 of the system 500S according to a third example of the present disclosure may be configured as a system-on-chip (SoC).

According to a third example of the present disclosure, each of the plurality of devices 100-1, 100-2, 100-3, 100-4 of the system 500S is configured to perform inference using a respective lower performance model, and the plurality of on-premises servers 400-1, 400-2 are configured to perform inference using an intermediate model. The intermediate model may refer to a model having more parameters than the lower performance model but fewer parameters than the higher performance model. The plurality of lower performance models, the plurality of intermediate models, and the higher performance model are configured to cooperate with each other to process speculative decoding. To generate a higher-level answer, the system 500S may be configured to utilize the lower-level model to accept or reject tokens from the lower-level model.

A memory (not shown) of each device according to a third example of the present disclosure is configured to store weight parameters and tokens of a respective lower performance model of the respective device upon operation of the respective device.

A memory (not shown) of each of the on-premises servers according to a third example of the present disclosure is configured to store weight parameters and tokens of the respective intermediate model upon operation of the respective on-premises server.

A memory (not shown) of the cloud server 500, according to a third example of the present disclosure, is configured to store weight parameters and tokens of the higher performance model when the cloud server 500 is operating.

The plurality of devices 100-1, 100-2, 100-3, 100-4 according to a third example of the present disclosure may be configured to provide low-power functionality for utilization in their respective on-device applications.

The low-power modes of the plurality of devices 100-1, 100-2, 100-3, 100-4 according to the third example of the present disclosure may be provided, for example, a sleep mode, a deep sleep mode, a retention mode, and the like.

The system 500S according to a third example of the present disclosure may be configured to provide at least one low-power mode while simultaneously providing speculative decoding in an on-premises server environment and/or a cloud server environment.

Figure 10:
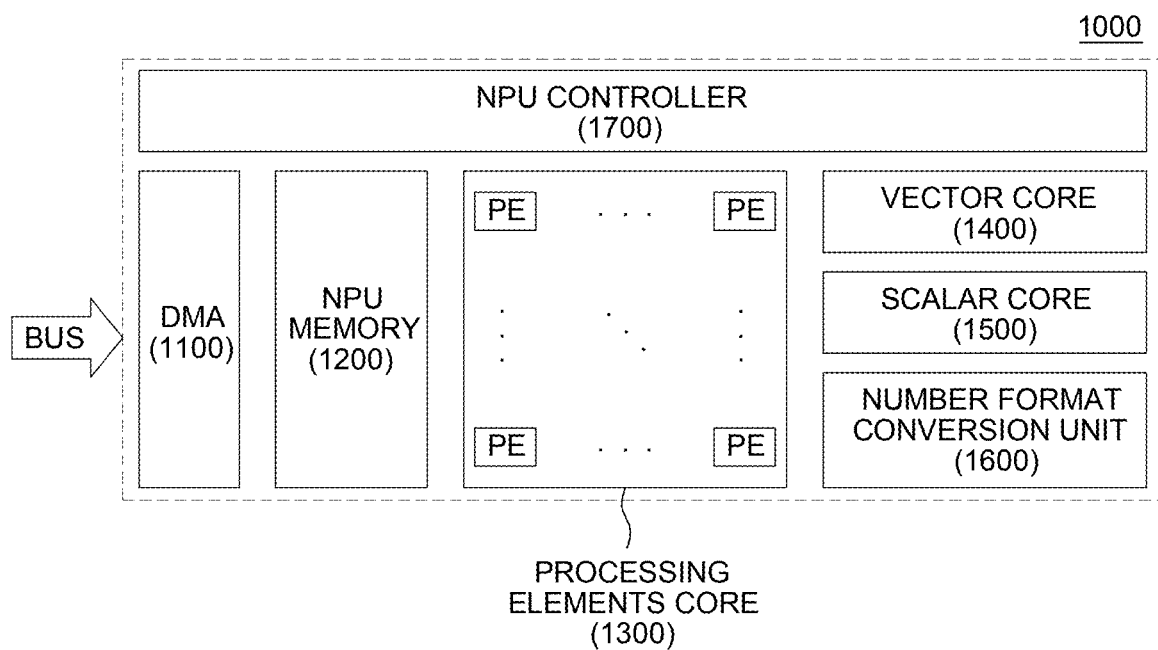
FIG. 10 illustrates a neural processing unit that can be applied to the examples of the present disclosure.

FIG. 10 illustrates a neural processing unit that can be applied to the examples of the present disclosure. The neural processing unit 1000, applicable to examples of the present disclosure, may include a DMA 1100, an NPU memory 1200, a processing element core 1300, a vector core 1400, a scalar core 1500, a number format conversion unit 1600, and an NPU controller 1700.

The neural processing unit 1000 is a processor, independent of a processor such as a CPU or GPU, specialized for operations for a deep neural network (DNN). In particular, the neural processing unit 1000 may include a plurality of processing elements specialized for matrix multiplication, which accounts for the majority of computation in a DNN.

The NPU controller 1700 may be electrically coupled to the DMA 1100, the NPU memory 1200, the processing element core 1300, the vector core 1400, the scalar core 1500, and the number format conversion unit 1600. The NPU controller 1700 may be configured to control operations associated with the speculative decoding operation in the neural processing unit 1000. The NPU controller 1700 may be configured to execute the speculative decoding by execution code generated by a compiler (not shown). Here, the compiler (not shown) may be embodied as a semiconductor circuit, or software operating on a separate device. The compiler (not shown) may translate a particular neural network model (e.g., a higher performance model (UM) or lower performance model (LM)) into executable code that may be executed on the neural processing unit 1000. That is, the compiler (not shown) may generate neural processing unit-specific executable code that can be executed on a particular neural processing unit having a particular performance. The execution code may also be referred to as machine code or binary code. The execution code may include a plurality of execution codes corresponding to the higher performance model (UM), such as a first execution code and a second execution code corresponding to the lower performance model (LM). Accordingly, the NPU controller 1700 may be configured to control the DMA 1100, the NPU memory 1200, the processing element core 1300, the vector core 1400, the scalar core 1500, and the number format conversion unit 1600, and the like based on various instructions and operation schedules included in the execution code. The execution code may be programmed to control the neural processing unit 1000 according to a length of tokens of the response being generated.

For example, the compiler may generate execution code that determines, based on hardware characteristics of the first neural processing unit (NPU1) (e.g., computational performance of a processing element core, computational performance of a vector core, computational performance of a scalar core, a time of operation of the number format conversion unit, a capacity of the NPU memory, and a memory bandwidth of a corresponding bus), a read/write order of data according to speculative decoding, a processing order of neural network operations, and the like.

The DMA 1100 is configured to allow the neural processing unit 1000 to directly access and read/write to a memory electrically coupled to the neural processing unit 1000 (e.g., at least the memory shown in FIGS. 3 through 5). The neural processing unit 1000 may transfer various data related to speculative decoding from the memory (not shown) via the DMA 1100. The DMA 1100 may be configured to perform tasks such as setting addresses of the NPU memory 1200, generating and controlling read/write instructions, and the like.

The NPU memory 1200 is memory disposed in an on-chip region of the neural processing unit 1000 and may include memory for caching or storing data processed in the on-chip region, or register files for storing instructions for driving a compiled neural network model. Here, the register file may be configured to be included in the NPU controller 1700. The NPU memory 1200 may read and store data required for the speculative decoding operation from a memory (not shown) associated with the bus. The NPU memory 1200 may comprise one of memories such as SRAM, register file, DRAM, resistive RAM, magneto-resistive RAM, phase-change RAM, ferroelectric RAM, flash memory, and the like. The NPU memory 1200 may comprise at least one memory unit. The NPU memory 1200 may comprise a homogeneous memory unit or a heterogeneous memory unit. The NPU memory 1200 may have a capacity of, for example, several megabytes to tens of megabytes, but is not limited to.

Processing element core 1300, vector core 1400, and scalar core 1500 are calculation circuits configured to efficiently process an attention layer of a higher performance model (UM) or lower performance model (LM). The attention layer may use input values and parameters such as query (Q), key (K), and value (V) to obtain operational values, attentions (Q,K,V). The processing element core 1300, vector core 1400, and scalar core 1500 are designed to process operations such as Matmul, DynamicQuant, RMS-Norm, and Softmax for computing the attention. The data form of the above operations may be one of a multidimensional matrix form, a two-dimensional matrix form, a one-dimensional array form, or a scalar, and one of the processing element core 1300, the vector core 1400, and the scalar core 1500 may be selected to process the operations according to the data form. Thus, the neural processing unit 1000 may accelerate the computation of the generative artificial intelligence model quickly and at low power.

The processing element core 1300 comprises N×M operators. N and M are integers greater than one. The processing element core 1300 in a two-dimensional array may be configured to process a plurality of processing elements (PEs) in parallel to perform matrix multiplication operations on input data and corresponding parameters (e.g., a weight, a kernel, a query (Q), a key (K), a value (V), etc.). The processing element (PE) may include a multiply and accumulate (MAC) operator. The processing element core 1300 may efficiently process matrix multiplication (e.g., Matmul or GEMM) or convolution operations (e.g., Conv). The processing element core 1300 may be configured to receive integer parameters as input and to output integer parameters as output. In particular, as the number of processing elements (PEs) included in the processing element core 1300 increases, the number of transistors in the ASIC may increase, and the manufacturing cost may increase. If the processing element core 1300 is designed to process integer parameters, rather than floating-point, the number of transistors in the ASIC can be reduced and the power consumption of the neural processing unit 1000 can be reduced. The number of processing elements (PEs) may range from hundreds to tens of thousands.

The vector core 1400 comprises 1×N operators. N is an integer greater than 1. The vector core 1400 is configured to include a plurality of arithmetic logic unit (ALU) operators. The vector core 1400 includes a multiplier and an adder. The vector core 1400 may include a vector register file for storing array data in a one-dimensional form. The vector core 1400 may be configured to receive floating-point parameters as input and to output floating-point parameters.

The scalar core 1500 comprises 1×1 operators. The scalar core 1500 is a circuit designed to process only one data element. The scalar core 1500 is configured to include an arithmetic logic unit (ALU) operator. The scalar core 1500 includes a multiplier and an adder. The scalar core 1500 may be configured to receive floating-point parameters as input, and to output floating-point parameters as output.

The number format conversion unit 1600 may be configured to include a quantization circuit and a de-quantization circuit. For example, the inputs and outputs of the processing element core 1300 may be integers. The inputs and outputs of the vector core 1400 and the scalar core 1500 may be floating-point. Accordingly, the number format conversion unit 1600 may convert data to a data form required by each core during data transfer between the processing element core 1300, the vector core 1400, and the scalar core 1500. The quantization circuit of the number format conversion unit 1600 may convert an integer to a floating-point. The de-quantization circuit of the number format conversion unit 1600 may convert a floating-point to an integer.

According to the examples of the present disclosure, the floating-point is not limited to IEEE standard 754, and brain floating-point may be applied to improve computational efficiency, reduce memory usage, reduce power consumption, etc. of the neural processing unit 1000. However, examples of the present disclosure are not limited thereto, and dynamic floating-point, variable precision floating-Point (VPFP), custom floating-point (CFP), flexible floating-point (FFP), and the like may be applied. VPFP is a floating-point format that allows the bitwidth of the exponent and mantissa to be dynamically set or adjusted. VPFP allows for flexible precision levels based on specific calculations to optimize power and performance. The dynamic floating-point format, used interchangeably with variable precision, allows the mantissa and exponent sizes to be adjusted on the fly during runtime to respond to data characteristics in real time. CFP represents an application-specific format where the bit allocation for the mantissa and exponent is tailored to the needs of the specific use case. This can be useful for hardware implementations that select the correct bitwidth to optimize hardware resources and data accuracy. FFP refers to a floating-point format that allows for adjustable bit allocation between the exponent and mantissa. FFP may be implemented in hardware accelerators to provide an optimal balance between range and precision. According to examples of the present disclosure, the bitwidth of the floating-point may be between 4 bits and 32 bits. According to examples of the present disclosure, the bitwidth of an integer may be between 4 bits and 32 bits.

Figure 11:
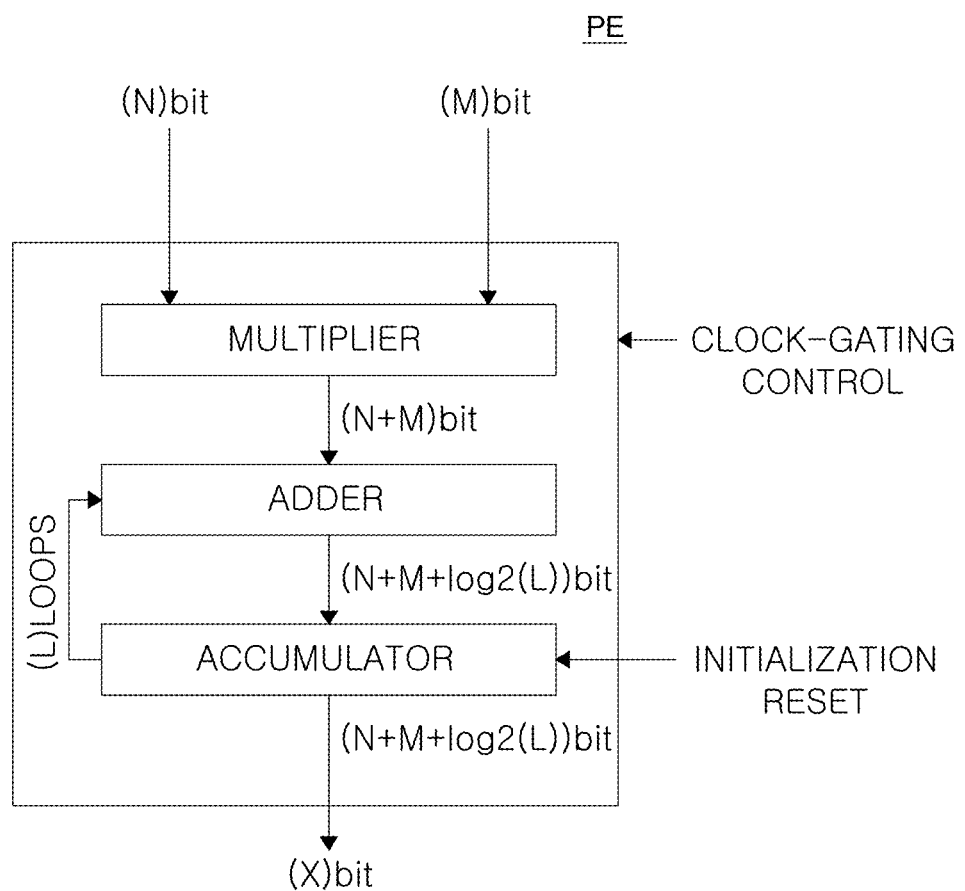
FIG. 11 illustrates a processing element that can be applied to examples of the present disclosure.

FIG. 11 illustrates a processing element that can be applied to examples of the present disclosure. Referring to FIG. 11, the processing element (PE) may be configured to include a multiplier, an adder, and an accumulator.

The multiplier multiplies the input (N) bits data with (M) bits data. The result of the multiplier's operation is output as (N+M) bits data, where N and M are integers greater than zero. The first input may be configured to receive (N) bits data. The second input may be configured to receive (M) bits data. The first input may be configured to receive an activation parameter and the second input may be configured to receive a weight parameter.

The NPU controller 1700 may constrain the operation of the multiplier to not perform an operation (e.g., zero-skipping operation) because the processing element (PE) knows that when a parameter with a value of zero is input to an input of one of the first input and the second input of the multiplier, the result of the operation will be zero even if the operation is not performed. For example, when a zero is input to an input of one of the first input and the second input of the multiplier of the processing element (PE), the multiplier may be configured to operate in a zero-skipping manner. Additionally, the lower performance model (LM) may have fewer parameters than the higher performance model (UM), or may be a pruned model of the higher performance model (UM). In such cases, the power consumption of the neural processing unit 1000 processing the lower performance model (LM) may be reduced by zero-skipping to increase reduction efficiency. For zero-skipping, each of the processing elements (PEs) included in the processing element core 1300 may be enabled or disabled, respectively. The NPU controller 1700 may be configured to provide an enable or disable signal (CLOCK-GATING CONTROL) to each processing element (PE) on a clock-by-clock basis to each processing element (PE). Here, when the processing element (PE) is deactivated, the multiplier may be configured to be deactivated. Accordingly, the power consumed by the operation of the multiplier may be reduced. For example, information about the power consumption of the multiplier may be provided with reference to FIG. 12. The processing element (PE) may be designed to receive a control signal (CLOCK-GATING CONTROL) for controlling (i.e., enabling or disabling) the zero-skipping operation from the NPU controller 1700. Specifically, the multiplier of the processing element (PE) may be designed to receive a respective control signal (CLOCK-GATING CONTROL) for controlling the zero-skipping operation from the NPU controller 1700. Alternatively, the adder of the processing element (PE) may be alternatively designed to receive a control signal (CLOCK-GATING CONTROL) for controlling the zero-skipping operation from the NPU controller 1700. Alternatively, each of the multiplier and adder of the processing element (PE) may be alternatively designed to simultaneously receive a respective control signal (CLOCK-GATING CONTROL) for controlling the zero-skipping operation from the NPU controller 1700.

The bitwidth of the parameters input to the first input and the second input of the processing element (PE) may be determined according to the quantization of the activation parameters and the quantization of the weight parameters of the higher performance model (UM) and the lower performance model (LM), respectively. For example, the activation parameters may be quantized to 12 bits and the weight parameters may be quantized to 8 bits for the higher performance model (UM), and the activation parameters may be quantized to 8 bits and the weight parameters may be quantized to 4 bits for the lower performance model (LM). The quantization level of each parameter may be determined in the compiler (not shown), i.e., the bitwidth of the parameters input to the respective inputs of the processing element (PE) may be different. The quantization information of the data input to each input of the processing element (PE) may be included in the execution code. The execution code may include a first execution code corresponding to the higher performance model (UM) and a second execution code corresponding to the lower performance model (LM).

The accumulator uses an adder for (L) number of loops to accumulate the result of the multiplier and the result of the accumulator. Therefore, the bitwidth of the data at the output and input of the accumulator can be output as (N+M+log 2(L))bits, where L is an integer greater than zero. When the accumulator finishes accumulating, an initialization signal (INTIALIZATION RESET) may be input to initialize the data stored inside the accumulator to zero. The accumulator of the processing element (PE) is configured to retain the accumulated value when zero-skipping is enabled. (X) bit may be set to a bitwidth such that an overflow of (X) bits of output data does not occur based on a maximum value that can be accumulated in the accumulator. For example, (X) bit may be from 16 bits to 64 bits.

As described further below, the number format conversion unit 1600 may convert integer parameters output from the processing element core 1300 to floating-point and transmit them to one of the vector core 1400, the scalar core 1500, and the NPU memory 1200. The number format conversion unit 1600 may be controlled by the NPU controller 1700.

Figure 12:
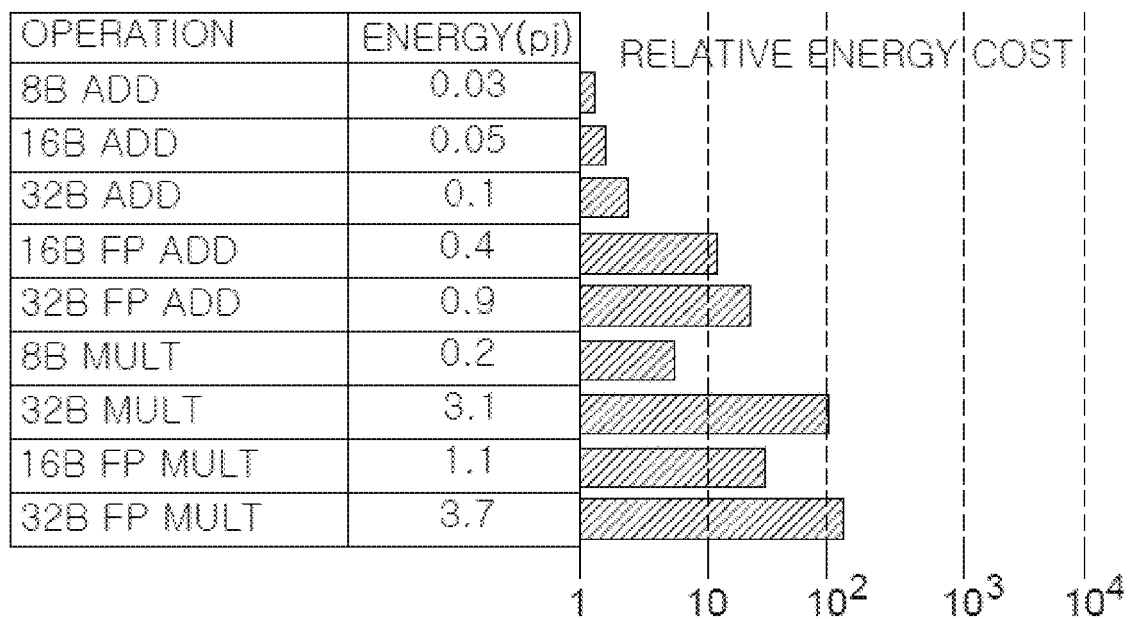
FIG. 12 is a table schematically illustrating energy consumption per unit operation of a neural processing unit, according to examples of the present disclosure.

FIG. 12 is a table schematically illustrating energy consumption per unit operation of a neural processing unit according to examples of the present disclosure. Referring to FIG. 12, the power consumption of a processing element core 1300, a vector core 1400, and a scalar core 1500 of the neural processing unit 1000 will be described. Referring to FIG. 12, a table schematically describes the energy consumed per unit operation of various operators of the neural processing unit 1000. For example, the energy consumption may be described separately for addition operations and multiplication operations. However, the energy consumed per unit operation may vary according to the foundry process technology of the semiconductor chip (e.g., 2 nm technology, 5 nm technology, 7 nm technology, 14 nm technology, 28 nm technology, etc.).

This will be described with reference to processing core 1300. The processing core 1300 may be designed to compute integer parameters. In FIG. 12, "8b Add" refers to an 8-bit integer addition operation of the adder. An 8-bit integer addition operation may consume 0.03 pj of energy. "16b Add" refers to a 16-bit integer addition operation of the adder. A 16-bit integer addition operation can consume 0.05 pj of energy. "32b Add" refers to a 32-bit integer addition operation of the adder. A 32-bit integer addition operation may consume 0.1 pj of energy. As further explained, when the processing core 1300 includes thousands or more processing elements (PEs) designed as integer operators, the level of power reduction of the neural processing unit 1000 can be significant when compared to when the processing core includes the same number of processing elements designed as floating-point operators. In general, for generative artificial intelligence models, most of the computation is performed on the processing core 1300. Thus, This will be described with reference to vector core 1400 and scalar core 1500. The vector core 1400 and scalar core

1500 can be designed to compute floating-point parameters. "16b FP Add" refers to a 16-bit floating-point addition operation of the adder. A 16-bit floating-point addition operation may consume 0.4 pj of energy. "32b FP Add" refers to a 32-bit floating-point addition operation of the adder. A 32-bit floating-point addition operation may consume 0.9 pj of energy. "8b Mult" refers to an 8-bit integer multiplication operation of the multiplier. An 8-bit integer multiplication operation can consume 0.2 pj of energy. "32b Mult" refers to a 32-bit integer multiplication operation of the multiplier. A 32-bit integer multiplication operation may consume 3.1 pj of energy. "16b FP Mult" refers to a 16-bit floating-point multiplication operation of the multiplier. A 16-bit floating-point multiplication operation may consume 1.1 pj of energy. "32b FP Mult" refers to a 32-bit floating-point multiplication operation of the multiplier. A 32-bit floating-point multiplication operation may consume 3.7 pj of energy.

According to examples of the present disclosure, the bitwidth of the integer parameters of the lower performance model (LM) may be equal to or less than the bitwidth of the integer parameters of the higher performance model (UM). The compiler (not shown) may be configured to determine the bitwidth of the integer parameter of the lower performance model (LM) and the bitwidth of the integer parameter of the higher performance model (UM). For example, the execution code of the higher performance model (UM) compiled to process the weight parameters in integer form of the first bitwidth may be executed in the NPU controller 1700 in the neural processing unit 1000. The execution code of the higher performance model (UM) compiled to process the activation parameters in the form of an integer of the second bitwidth may be executed in the NPU controller 1700 in the neural processing unit 1000. Execution code of the lower performance model (LM) compiled to process the weight parameters in the form of an integer of a third bitwidth may be executed in the NPU controller 1700 in the neural processing unit 1000. The execution code of the lower performance model (LM) compiled to process the activation parameters in the form of an integer of a fourth bitwidth may be executed in the NPU controller 1700 in the neural processing unit 1000.

According to examples of the present disclosure, the bitwidth of the floating-point parameters of the lower performance model (LM) may be equal to or smaller than the bitwidth of the floating-point parameters of the higher performance model (UM). The compiler (not shown) may be configured to determine the bitwidth of the floating-point parameters of the lower performance model (LM) and the bitwidth of the floating-point parameter of the higher performance model (UM). For example, execution code of the higher performance model (UM) compiled to process a weight parameters in floating-point form of a fifth bitwidth may be executed in the NPU controller 1700 in the neural processing unit 1000. The execution code of the higher performance model (UM) compiled to process the activation parameters in the form of a floating-point of a sixth bitwidth may be executed in the NPU controller 1700 in the neural processing unit 1000. Execution code of the lower performance model (LM) compiled to process weight parameters in the form of a floating-point of a seventh bitwidth may be executed in the NPU controller 1700 in the neural processing unit 1000. Execution code of the lower performance model (LM) compiled to process an activation parameter in floating-point form of an eighth bitwidth may be executed in the NPU controller 1700 in the neural processing unit 1000.

Technical features of the examples of the present disclosure may be described as follows.

According to examples of the present disclosure, a device may include a first memory of a first capacity configured to store a first generative neural network model comprising first parameters; and a first neural processing unit configured to generate a response corresponding to an input query utilizing the first generative neural network model stored in the first memory. The first neural processing unit may be configured to store a first execution code of the first generative neural network model compiled to process speculative decoding. Accordingly, the device may process speculative decoding. Further, a federated operation system of a plurality of language models utilizing speculative decoding or speculation decoding within an on-device may be provided.

According to some examples of the present disclosure, the first memory of the first capacity may be configured to store a second generative neural network model comprising a second parameters. The number of the second parameters may be greater than the number of the first parameters. Thus, speculative decoding can be implemented on-device, configured as a single device.

According to some examples of the present disclosure, the first memory of the first capacity may be a capacity capable of storing both the first generative neural network model and the second generative neural network model. Speculative decoding can avoid computing speed degradation due to the increased memory operations by separate external memory.

According to some examples of the present disclosure, the first neural processing unit may be configured to store the second execution code of the second generative neural network model that is compiled to process the speculative decoding. Thus, a plurality of generative neural network models can be processed simultaneously on the device.

According to some examples of the present disclosure, the first neural processing unit may further include a first NPU memory configured to communicate with the first memory and a first NPU controller configured to control the first neural processing unit.

According to some examples of the present disclosure, the first execution code may be configured to be stored in the first NPU memory or in the first NPU controller.

According to some examples of the present disclosure, a second memory of a second capacity configured to store a second generative neural network model comprising a second parameters may be further included. Thus, the device may effectively implement speculative decoding with one neural processing unit and a plurality of memories.

According to some examples of the present disclosure, a second memory of a second capacity configured to store a second generative neural network model comprising a second parameters; and a second neural processing unit configured to utilize the second generative neural network model stored in the second memory to generate a response corresponding to the input query may be further included. The second neural processing unit may be configured to store a second execution code of the second generative neural network model compiled to process the speculative decoding.

According to some examples of the present disclosure, a computational performance of the second neural processing unit may be higher than a computational performance of the first neural processing unit. For example, the computational performance of the first neural processing unit may be 25 TOPS, and the computational performance of the second neural processing unit may be 100 TOPS. Accordingly, the token generation rate of the second generative neural network model processed by the second neural processing unit may be reduced, and accordingly, the speculative decoding rate of the device may be improved.

According to some examples of the present disclosure, the device may be configured to operate in at least one of a sleep mode, a deep sleep mode, or a retention mode. At least one of the first neural processing unit and the second neural processing unit may be configured to operate in a low-power mode when awaiting computational results from another neural processing unit during the speculative decoding. Thus, when one neural processing unit handles a prefill operation, a generation operation, or a accept or reject operation, other neural processing unit can reduce the power consumption.

According to examples of the present disclosure, a system may include a device comprising: a first memory of a first capacity configured to store a first generative neural network model comprising first parameters; and a first neural processing unit configured to generate a response to an input query utilizing the first generative neural network model stored in the first memory; and an on-premises server comprising: a second memory of a second capacity configured to store a second generative neural network model comprising a second parameters; and a second neural processing unit configured to generate a response to an input query utilizing the second generative neural network model stored in the second memory. The first neural processing unit and the second neural processing unit may be configured to cooperate with each other to process speculative decoding. Thus, the system may utilize speculative decoding. Further, a federated operation system of a plurality of language models utilizing speculative decoding or speculation decoding on-device may be provided.

According to some examples of the present disclosure, the first memory of the first capacity may be capable of storing the first generative neural network model, and the second memory of the second capacity may be capable of storing the second generative neural network model. Thus, the system can avoid computing speed degradation due to the increase of memory operations by separate external memory during speculative decoding.

According to some examples of the present disclosure, the first neural processing unit may be configured to store a first execution code of the first generative neural network model compiled to process the speculative decoding, and the second neural processing unit may be configured to store a second execution code of the second generative neural network model compiled to process the speculative decoding, respectively. Thus, the system may utilize a plurality of generative neural network models to implement speculative decoding.

According to some examples of the present disclosure, the computational performance of the second neural processing unit of the on-premises server may be higher than the computational performance of the first neural processing unit of the device. Thus, the processing speed of the system's speculative decoding can be improved.

According to some examples of the present disclosure, the devices may be plural, and each device may be configured to process the speculative decoding through the server. Thus, the server can effectively handle speculative decoding corresponding to multiple devices.

According to some examples of the present disclosure, at least one of the plurality of devices may be configured to operate in at least one of a sleep mode, a deep sleep mode, or a retention mode. Thus, due to the nature of the speculative decoding, the power consumption of the awaiting device can be reduced.

According to some examples of the present disclosure, the first generative neural network model may be a lower performance model, and the second generative neural network model may be a higher performance model. The higher performance model may be configured to process the speculative decoding while being selectively deactivated. Thus, even if the awaiting neural processing unit operates in a low-power mode, it may not affect the token generation rate, and the power consumption may be reduced.

According to some examples of the present disclosure, the speculative decoding may include a prefill operation, a generation operation, and an accept or reject operation.

According to examples of the present disclosure, a device may include: a first memory configured to store a first generative neural network model; and a first neural processing unit, configured to generate a response corresponding to an input query utilizing the first generative neural network model stored in the first memory. The first neural processing unit may include a processing core configured to receive input integer parameters; a vector core and a scalar core configured to receive input floating-point parameters; and a number format conversion unit configured to convert the integer parameters and the floating-point parameters for processing operations of the first generative neural network model. Thus, the device is able to process speculative decoding quickly and with low-power.

The examples of the present disclosure disclosed herein and in the drawings are given by way of illustration only to facilitate the description and understanding of the present disclosure, and are not intended to limit the scope of the present disclosure. It will be apparent to those having ordinary skill in the art to which the present disclosure belongs that other variations based on the technical ideas of the invention may be practiced in addition to the examples disclosed herein.

NATIONAL RESEARCH AND DEVELOPMENT PROJECT SUPPORTING THE PRESENT INVENTION

[Project Identification Number] 1711195792
[Project Number] 00228938
[Ministry Name] Ministry of Science and ICT
[Project Management (professional) Institution Name] Institute for Information & Communications Technology Planning & Evaluation
[Research Project Name] Development of AI Semiconductor SW Convergence Platform Technology
[Research Project Name] Development of AI SoC Semiconductor SW Development Platform Technology for Commercial Use
[Name of project performing organization] DeepX Co., Ltd.
[Research Period] 2023 Apr. 1~2023 Dec. 31

What is claimed is:

1. A device comprising:
   a first memory of a first capacity and configured to store first parameters of a first generative neural network model;
   a second memory of a second capacity and configured to store second parameters of a second generative neural network model, a number of the second parameters is larger than a number of the first parameters; and
   a neural processing unit configured to:
      read at least a subset of the first parameters to execute the first generative neural network model, generate a response corresponding to an input query by processing the input query using the first generative neural network model, read at least a subset of the second parameters to execute the second generative neural network model, perform an accept or rejection operation on the response using the second generative neural network model alternately with processing of the input query using the first generative neural network model to perform speculative decoding, generate attention parameters from at least a portion of the input query processed by the first generative neural network model, and perform the accept and rejection operation by the second generative neural network model using the attention parameters.

2. The device of claim 1, wherein the fust-neural processing unit is further configured to store at least part of first execution code for executing the first generative neural network model.

3. The device of claim 2, wherein the neural processing unit is configured to store at least part of second execution code for executing the second generative neural network model.

4. The device of claim 1, wherein the neural processing unit further comprises an internal memory configured to communicate with the first memory and a controller circuit configured to control operations of the fust-neural processing unit.

5. The device of claim 4, wherein first execution code for executing the first generative neural network model is stored in the internal memory or in the controller circuit.

6. The device of claim 1, further comprising a second memory of a second capacity configured to store second parameters of the second generative neural network model.

7. The device of claim 1, wherein the response comprises at least a token generated by executing the first generative neural network model.

8. The device of claim 1, wherein the neural processing unit is configured to operate in a low-power mode before receiving the input query.

9. The device of claim 1, wherein the neural processing unit is configured to store execution states of the first generative neural network model and the second generative neural network model.

10. The device of claim 9, wherein the states comprise at least one of program counters, pointers to attention parameters, and statuses of operations of the first generative neural network model and the second generative neural network model.

11. The device of claim 9, wherein the neural processing unit is configured to prefetch the at least subset of the second parameters during generating of the response using the first generative neural network model.

12. The device of claim 1, further comprising:

a first communication bus between the first memory and the neural processing unit, the first communication bus configured to transmit the at least subset of the first parameters to the neural processing unit; and a second communication bus between the second memory and the neural processing unit, the second communication bus separate from the first communication bus and configured to transmit the at least subset of the second parameters.

13. The device of claim 12, wherein the first communication bus has a wider data path compared to the second communication bus.

14. The device of claim 12, wherein the second communication bus has more channels or a higher clock frequency compared to the first communication bus.

15. The device of claim 1, wherein the generating of the attention parameters is skipped when using the second generative neural network model.

16. The device of claim 1, wherein the generated attention parameters are stored in the first memory and transferred to the second memory for reading to perform the accept and rejection operation by the second generative neural network model via direct memory-to-memory transfer.

17. The device of claim 1, wherein the neural processing unit is further configured to:

establish a direct mapping of the generated attention parameters for access during performance of the accept and rejection operation using the generated attention parameters.

18. A device comprising:

a memory configured to store a first generative neural network model and a second generative neural network model having a larger number of parameters than the first generative neural network model; and a neural processing unit configured to:

perform speculative decoding by executing the first generative neural network model and the second generative neural network model in a time-divisional manner, generate a response corresponding to an input query by reading the first generative neural network model from the memory and executing the first generative neural network model on the input query, generate attention parameters from at least a portion of the input query Processed by the first generative neural network model, and perform an accept and rejection operation by the second generative neural network model using the attention parameters, the neural processing unit comprising:

a processing core circuit configured to receive input integer parameters, a vector core circuit and a scalar core circuit configured to receive input floating-point parameters, and a number format conversion circuit configured to convert between the integer parameters and the floating-point parameters to process the generative neural network model.

* * * * *